(12) United States Patent
Clark et al.

(10) Patent No.: US 11,537,679 B2
(45) Date of Patent: Dec. 27, 2022

(54) DATA-DRIVEN NAVIGATION AND NAVIGATION ROUTING

(71) Applicant: Home Box Office, Inc., New York, NY (US)

(72) Inventors: Brendan Joseph Clark, Seattle, WA (US); J. Jordan C. Parker, Seattle, WA (US); Nathan J. E. Furtwangler, Kirkland, WA (US)

(73) Assignee: HOME BOX OFFICE, INC., New York, NY (US)

( * ) Notice: Subject to any disclaimer, the term of this patent is extended or adjusted under 35 U.S.C. 154(b) by 0 days.

(21) Appl. No.: 17/132,062

(22) Filed: Dec. 23, 2020

(65) Prior Publication Data

US 2021/0109979 A1 Apr. 15, 2021

Related U.S. Application Data

(63) Continuation of application No. 14/843,765, filed on Sep. 2, 2015, now abandoned.
(Continued)

(51) Int. Cl.
*G06F 16/955* (2019.01)
*G06F 3/0482* (2013.01)
(Continued)

(52) U.S. Cl.
CPC .......... *G06F 16/955* (2019.01); *G06F 3/0482* (2013.01); *G06F 16/24* (2019.01); *G06F 16/40* (2019.01); *G06F 16/43* (2019.01); *G06F 16/48* (2019.01); *G06F 40/137* (2020.01); *G06F 40/14* (2020.01)

(58) Field of Classification Search
CPC .......... G06F 16/24; G06F 16/40; G06F 16/43; G06F 16/48; G06F 16/955; G06F 40/137; G06F 40/14; G06F 3/0482
See application file for complete search history.

(56) References Cited

U.S. PATENT DOCUMENTS 6,539,424 B1 * 3/2003 Dutta .................. G06F 16/9566
707/E17.115
6,820,111 B1 11/2004 Rubin et al.
(Continued)

OTHER PUBLICATIONS

International Search Report and Written opinion from International Patent Application Serial No. PCT/US15/48425, dated Dec. 17, 2015, 13 pages.
(Continued)

*Primary Examiner* — Jeremy L Stanley
(74) *Attorney, Agent, or Firm* — Amin, Turocy & Watson, LLP

(57) ABSTRACT

The described technology is directed towards data-driven navigation, in which a next navigation location depends on variable data associated with an interactive user interface element (rather than a fixed link). The data may be in a hierarchy of data models. A menu contains interactive navigation elements, each bound to a data model. A selected interactive navigation element results in locating a data model associated with the selected element. The data model is used to determine the next navigation location. Also described is hierarchical navigation to one item of a level as well as lateral and peer navigation.

20 Claims, 14 Drawing Sheets

Related U.S. Application Data

(60) Provisional application No. 62/046,094, filed on Sep. 4, 2014.

(51) Int. Cl.

| | | |
|---|---|---|
| *G06F 16/24* | (2019.01) | |
| *G06F 16/43* | (2019.01) | |
| *G06F 16/48* | (2019.01) | |
| *G06F 16/40* | (2019.01) | |
| *G06F 40/14* | (2020.01) | |
| *G06F 40/137* | (2020.01) | |

(56) References Cited

U.S. PATENT DOCUMENTS

| | | | |
|---|---|---|---|
| 6,931,604 B2 | 8/2005 | Lane | |
| 8,412,766 B1 | 4/2013 | Meymann et al. | |
| 8,504,922 B2 | 8/2013 | Newell et al. | |
| 8,949,736 B2 | 2/2015 | Balko et al. | |
| 9,239,836 B1 | 1/2016 | Aprotosoaie et al. | |
| 9,262,646 B1 | 2/2016 | Ye et al. | |
| 9,594,844 B2 | 3/2017 | Zeigler et al. | |
| 9,678,748 B2 | 6/2017 | Sivaramamurthy et al. | |
| 2001/0033296 A1* | 10/2001 | Fullerton | H04N 21/4438 715/730 |
| 2002/0152267 A1 | 10/2002 | Lennon | |
| 2003/0018665 A1 | 1/2003 | Dovin et al. | |
| 2003/0135825 A1 | 7/2003 | Gertner et al. | |
| 2003/0137540 A1 | 7/2003 | Klevenz et al. | |
| 2004/0003346 A1 | 1/2004 | Blaschke et al. | |
| 2004/0139143 A1* | 7/2004 | Canakapalli | G06F 16/957 709/200 |
| 2004/0181515 A1 | 9/2004 | Ulmann et al. | |
| 2005/0080793 A1 | 4/2005 | Lauff | |
| 2005/0114756 A1 | 5/2005 | Lehikoinen et al. | |
| 2005/0125285 A1* | 6/2005 | McQueeney | G06Q 30/0251 705/51 |
| 2005/0132018 A1* | 6/2005 | Milic-Frayling | G06F 16/955 709/213 |
| 2005/0132297 A1 | 6/2005 | Milic-Frayling et al. | |
| 2005/0188408 A1 | 8/2005 | Wallis et al. | |
| 2005/0193015 A1 | 9/2005 | Logston et al. | |
| 2005/0197141 A1* | 9/2005 | Jiang | G06F 16/955 455/457 |
| 2005/0204292 A1 | 9/2005 | Kibilov | |
| 2005/0283804 A1 | 12/2005 | Sakata et al. | |
| 2006/0218499 A1* | 9/2006 | Matthews | G06F 16/313 707/E17.084 |
| 2006/0253465 A1 | 11/2006 | Willis et al. | |
| 2007/0028270 A1 | 2/2007 | Ostojic et al. | |
| 2007/0271532 A1* | 11/2007 | Nguyen | H04N 21/4316 715/854 |
| 2008/0071657 A1 | 3/2008 | Matic | |
| 2008/0301167 A1 | 12/2008 | Goldeen et al. | |
| 2009/0006351 A1 | 1/2009 | Stephenson et al. | |
| 2009/0044150 A1 | 2/2009 | Liu et al. | |
| 2009/0063547 A1* | 3/2009 | Wright | G06F 16/64 |
| 2009/0106732 A1 | 4/2009 | Hanson et al. | |
| 2009/0138438 A1 | 5/2009 | Wilson | |
| 2009/0319955 A1 | 12/2009 | Malek et al. | |
| 2009/0327230 A1 | 12/2009 | Levin et al. | |
| 2010/0185653 A1 | 1/2010 | Fortuna et al. | |
| 2010/0131441 A1 | 5/2010 | Gruenhagen et al. | |
| 2011/0066982 A1 | 5/2011 | Paulsami et al. | |
| 2011/0179390 A1 | 7/2011 | Morris | |
| 2011/0239164 A1 | 9/2011 | Saraiya et al. | |
| 2011/0289458 A1* | 11/2011 | Yu | G06F 16/41 715/841 |
| 2011/0289459 A1 | 11/2011 | Athans et al. | |
| 2011/0296351 A1 | 12/2011 | Ewing, Jr. et al. | |
| 2012/0005600 A1 | 1/2012 | Ito | |
| 2012/0030577 A1 | 2/2012 | Akolkar et al. | |
| 2012/0036456 A1 | 2/2012 | Grunberger | |
| 2012/0089950 A1* | 4/2012 | Tseng | G06F 3/0484 715/854 |
| 2012/0102406 A1 | 4/2012 | Demant et al. | |
| 2012/0216117 A1 | 8/2012 | Arriola et al. | |
| 2013/0024811 A1 | 1/2013 | Gleadall et al. | |
| 2013/0093687 A1 | 4/2013 | Papakipos et al. | |
| 2014/0032581 A1 | 1/2014 | Young | |
| 2014/0053070 A1 | 2/2014 | Powers et al. | |
| 2014/0152564 A1 | 6/2014 | Gulezian et al. | |
| 2014/0188958 A1 | 7/2014 | Branton | |
| 2014/0189587 A1* | 7/2014 | Nam | H04N 21/44222 715/810 |
| 2014/0215408 A1 | 7/2014 | Park-Ekecs et al. | |
| 2014/0245269 A1 | 8/2014 | Thukkaram et al. | |
| 2014/0250390 A1 | 9/2014 | Holmes et al. | |
| 2014/0282013 A1 | 9/2014 | Amijee | |
| 2014/0304738 A1 | 10/2014 | Nakaoka et al. | |
| 2014/0380246 A1 | 12/2014 | Blundell et al. | |
| 2015/0277741 A1 | 10/2015 | Morse et al. | |
| 2015/0293649 A1* | 10/2015 | Sukumar | H04H 60/04 715/716 |
| 2015/0317408 A1 | 11/2015 | Hong et al. | |
| 2015/0356195 A1* | 12/2015 | Kilzer | H04N 5/85 715/234 |
| 2016/0048606 A1* | 2/2016 | Rubinstein | G06F 16/957 715/234 |
| 2017/0046447 A1 | 2/2017 | Peng et al. | |
| 2017/0097832 A1 | 4/2017 | Radhakrishnan et al. | |
| 2017/0220692 A1 | 8/2017 | Greenwood et al. | |

OTHER PUBLICATIONS

Non-Final Office Action received for U.S. Appl. No. 14/843,765 dated Dec. 15, 2017, 43 pages.

Final Office Action received for U.S. Appl. No. 14/843,765 dated Jul. 27, 2018, 37 pages.

Non-Final Office Action received for U.S. Appl. No. 14/843,765 dated Mar. 20, 2017, 60 pages.

Final Office Action received for U.S. Appl. No. 14/843,765 dated Aug. 16, 2019, 82 pages.

Non-Final Office Action received for U.S. Appl. No. 14/843,765 dated Jan. 9, 2020, 42 pages.

Final Office Action received for U.S. Appl. No. 14/843,765 dated Jul. 2, 2020, 96 pages.

U.S. Appl. No. 14/843,765, filed Sep. 2, 2015.

* cited by examiner

DATA-DRIVEN NAVIGATION AND NAVIGATION ROUTING

CROSS-REFERENCE TO RELATED APPLICATIONS

The present application is a continuation of and claims priority to U.S. patent application Ser. No. 14/843,765 filed on Sep. 2, 2015, entitled "DATA-DRIVEN NAVIGATION AND NAVIGATION ROUTING," which claims priority to U.S. provisional patent application Ser. No. 62/046,094, filed Sep. 4, 2014. The entireties of the aforementioned applications are hereby incorporated by reference herein.

BACKGROUND

A typical way to present interactive content to a user is by a set of pages. In general, a user starts at a home page, which contains links to other pages, and each other page may or may not contain its own links. A user thus navigates among the pages by actuating links (e.g., clicking on them or touching them) as placed by the developer. Home, back and forward buttons are also typically provided to assist the user navigation.

While this works for structured page content, it has drawbacks for other types of content, such as if the structure needs to change. For example, consider that an existing page needs to be divided into two (or more) pages, or that some new type of content is added that benefits from having its own page, rather than being placed on an existing page. In such situations, the developer has to recode each impacted page, including to update the links on possibly many pages to provide for navigation to the new page (or pages).

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, the technology described herein is directed towards data-driven navigation. One or more aspects are directed towards rendering a representation of a navigation location, including providing a set of one or more interactive user interface elements that are each bound to a data model. A user interface element is selected that is bound to an associated data model. The associated data model is accessed so as to use data in the associated data model to determine a next navigation location.

Other advantages may become apparent from the following detailed description when taken in conjunction with the drawings.

BRIEF DESCRIPTION OF THE DRAWINGS

The technology described herein is illustrated by way of example and not limited in the accompanying figures in which like reference numerals indicate similar elements and in which.

DETAILED DESCRIPTION

Figure 1:
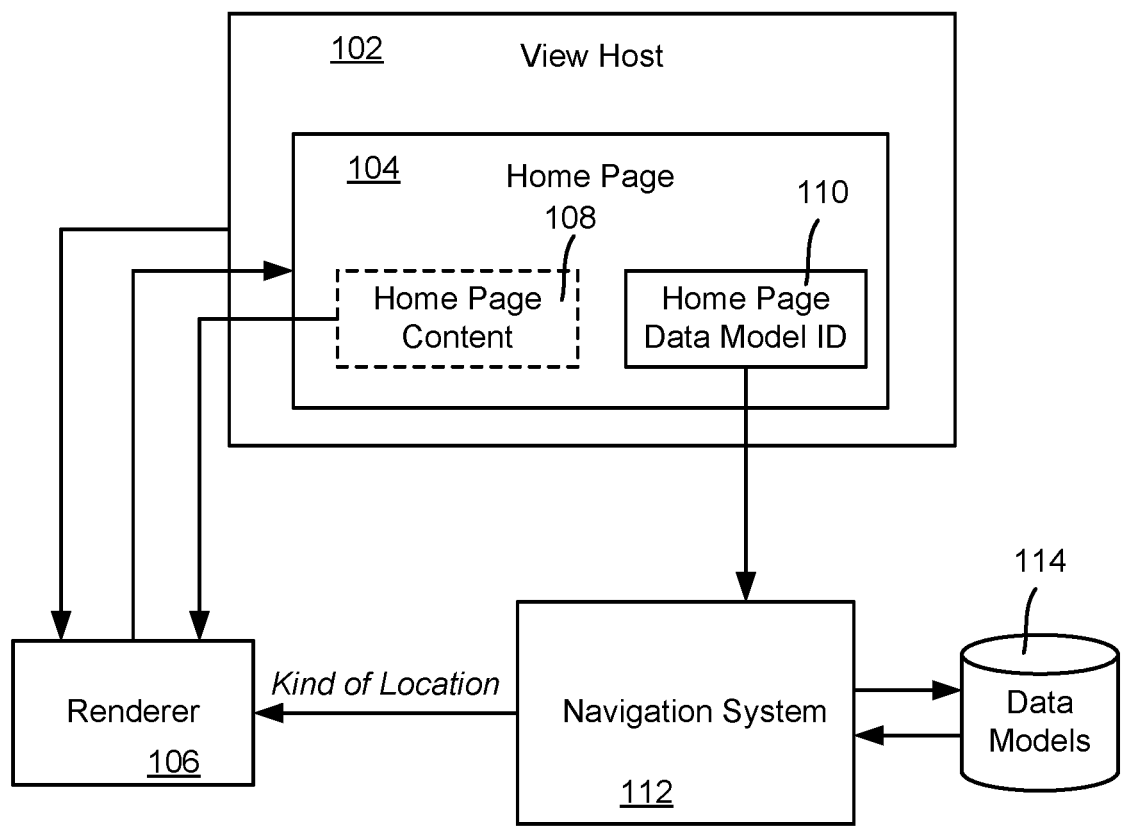
FIG. 1 is a block diagram showing example components that may be used for data-driven navigation, according to one or more example implementations.

Described herein is a technology that uses data to drive navigation among locations (e.g., pages and other user interface mechanisms) rather than page code, where in general, a location is an association between a navigation system that navigates to the location and a renderer that knows what to render based upon the type of location (e.g., a menu) and data (e.g., interactive tiles) associated with that location. To this end, locations are decoupled from the act of navigating. This is in contrast to a conventional link arrangement in which a location is associated with each link.

By way of example of the technology described herein, a page location (or other interactive element such as a dropdown menu) may contain a number of interactive user interface (UI) elements related to location navigation, e.g., one or more buttons, icons, tiles and/or the like. Each such element is bound via a suitable identifier to a particular set of associated data, referred to herein as a data model. When a given element is selected (e.g., clicked), the data related to that element is obtainable from the element's associated data model. Indeed, the home page itself may be made dependent on an underlying data model, (although some of the home page may contain fixed layout information and possibly some relatively fixed additional data, such as a company's logo or reference thereto). If a change is desired, the underlying data model bound to any location and/or its corresponding UI element may be changed at any time, which may be done without any modification to the home page code or any other page code. As one example result, if the data bound to a user interface element is changed, the navigation location automatically may change based upon the updated data.

When an element is selected, (e.g., clicked, touched or otherwise actuated), the home page need not have any concept of what a next location may be for that element, or any purpose underlying that element. Instead, the page only knows that the selected element is bound to a particular other data model by a suitable identifier, and that a navigation system is to be invoked with the identifier. When the other data model is accessed by the navigation system, the data model itself tells the navigation system a next action to take, which, for example may be to render and navigate to a new menu page based upon the other data model, or to render a content (e.g., movie) player page that plays a movie identified in the data model, or to render a search page, or to present some text and/or image data corresponding to the data model, and so on.

As a result, a developer only needs to provide a home page that binds to a "home page" data model having one or more interactive elements that are each in turn bound to another data model. If a change is needed, the underlying home page data model changes, however the home page code need not change. Further, no other pages need to have any links updated, because any such "links" are instead locations that are automatically processed from the changed data model.

As a more particular example, on a home page (bound to some data model X), an interactive UI element may be associated with an identifier for some other data model Y, e.g., via an object ID for Y. When the home page is rendered, the home page renders the UI element that is bound to the data model Y. Note that the data model X contains at least the information as to the type of UI element to render, such as a tile, and the content (e.g., text) to render within that element; however it is feasible that the data model X may contain other variable appearance information for an element to be rendered, such as color, desired size, animation data, and so forth.

Once rendered, if the UI element associated with data model Y is later selected, the navigation system is invoked to access the data model Y and perform a next action based upon action data (that is, navigation data) in the data model Y. For example, the data model Y may contain information indicating that the data model Y represents a "menu" page corresponding to a data model Y, whereby the navigation system knows to render a new menu page that is based upon other data in the data model Y (such as with new interactive elements containing text, relative locations for the elements, and each respective object ID for any other corresponding data model to which each new element is bound; text, images and so forth including references to external data also may be in data model Y). As needed, the navigation system may retrieve any other data identified in the data set Y. The navigation system then renders a new menu page based upon the data in data model Y, and navigates to that new menu page to allow for interaction with the newly rendered menu page's interactive elements.

As will be understood, if sometime later a change is desired to that other menu page (for data model Y), such as to add a new interactive element or change an existing one, only the data of data model Y need be changed, not any page code/logic. This leverages the fact that a menu-type page may be coded once to know how to lay out its interactive elements and other UI components, and thus such page code only need follow the information in the current data model, and need not be separately replicated for each similar page, nor linked to from other pages, nor contain any hardcoded links.

Similarly, a different type of location such as a movie player "page" need be coded only once to present and play a movie, given the identifier of that movie from a data model. Thus, although the identifier of the movie may change, the movie player location code need not change for each movie.

It should be understood that any of the examples herein are non-limiting. For example, only certain types of navigation locations are exemplified herein, including a "menu" location, a content (e.g., movie, TV show, video) "player" location and a "search" location, however these are only non-limiting examples and numerous other types of locations are feasible. As such, the technology described herein is not limited to any particular implementations, embodiments, aspects, concepts, structures, functionalities or examples described herein. Rather, any of the implementations, embodiments, aspects, concepts, structures, functionalities or examples described herein are non-limiting, and the technology may be used in various ways that provide benefits and advantages in computing and navigation concepts in general.

Turning to an example implementation, FIG. 1 shows a view host 102 hosting a home page 104. The view host 102 may be any suitable component in which user interface (UI) elements may be rendered, such as an object, the entire display, a portion of a display, a program window, a program's drop-down menu, a container (e.g., object), and so forth. The home page 104, as will be understood, comprises a "menu" location comprising a page, which, for example, may be a container UI element into which interactive UI elements such as icons, buttons and/or tiles may be rendered.

As is understood, in one or more implementations, at least some of the exemplified components in FIG. 1 may be objects, and thus may be hosted in other objects, interfaced with other objects, and so on. FIG. 1 is thus only an illustrative example, and the technology is not limited to any particular division of the components. Indeed, any of these example components may be combined, any component may be further divided into sub-components, and other components may be included in a given system. As is also understood, each figures including FIG. 1 is only an example.

As part of rendering the home page 104 (e.g., via renderer 106), any available home page content 108 (optional, as indicated by the dashed box) that may be present in the home page 104 may be used, along with the data model corresponding to the home page, which is known from the data model identifier (ID) 110. Note that via the home page content 108, the home page may be customized with something non-standard for a typical menu page, such as to let the user know that he or she is at the home page. However, because the home page is a menu location, no such optional content 108 need be present, as such data may be entirely contained in the home page data model.

The data model ID 110 is provided to a navigation system 112, which retrieves the "home page" data model from a set of data models 114, and uses the data model's data to determine the location type (e.g., menu) of the home page data model from a set of available locations known to the navigation system 112 and the renderer 106. Because in this example the home page is a menu location, the navigation system 112 provides an indication of the kind of location to render and thereby in this example directs the renderer 106 to render a menu-type page. The renderer 106 does so with one or more interactive elements that are based upon data in the home page data model. Note that data models may be objects in an object-oriented sense, and are often referred to as data model objects herein, however it is understood that "data model" or "data model object" refers to any suitable data structure or part of a structure that can be referenced to provide the desired data.

Figure 2:
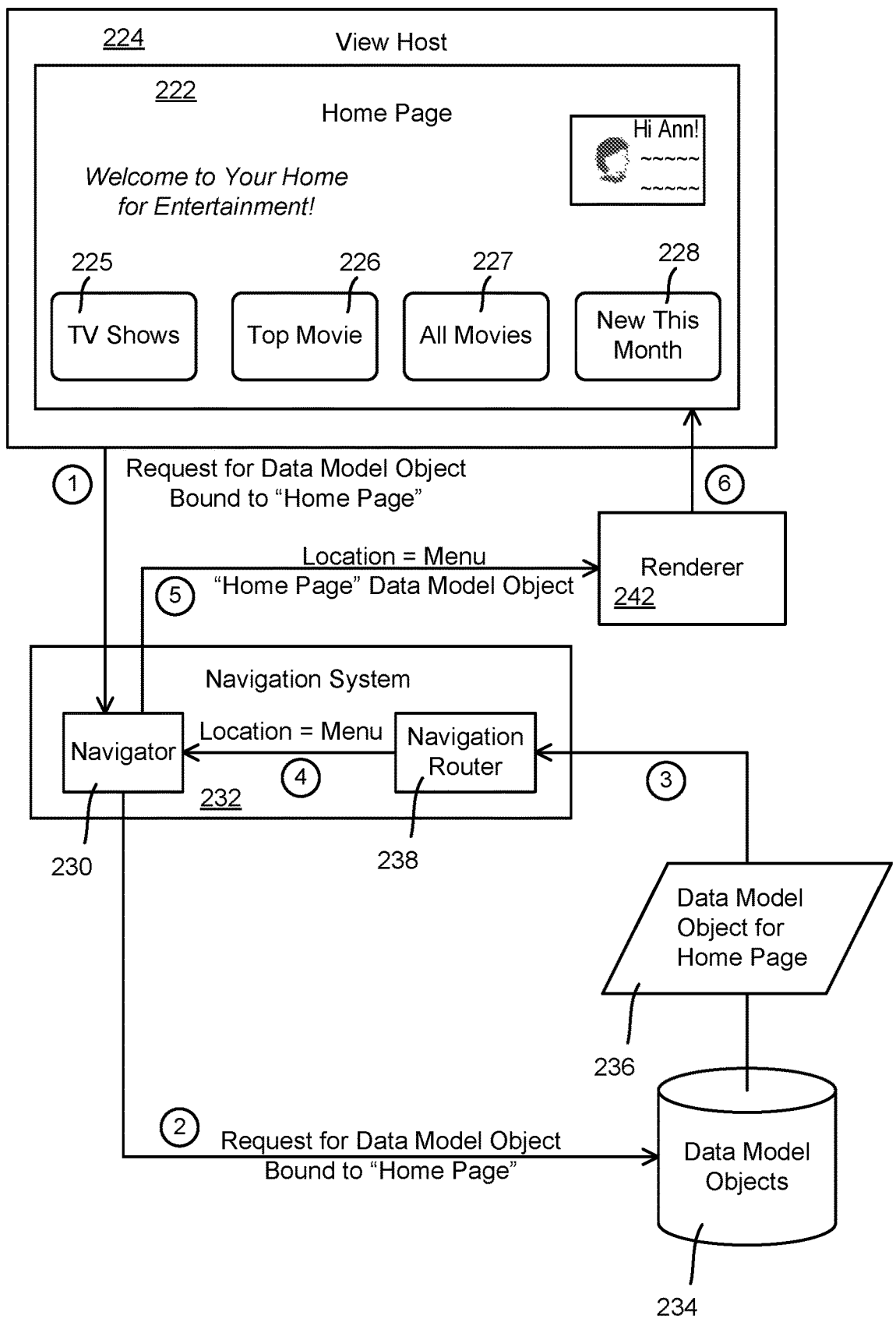
FIG. 2 is a block diagram and data flow diagram including an example representation of a home page that is rendered based upon a retrieved data model for that home page, according to one or more example implementations.

By way of example, FIG. 2 shows a rendered home page 222 for presenting media content, which may be hosted in any suitable view host 224 such as a browser, operating system window, dedicated application, UI container and so forth. The home page 222 contains four interactive UI elements, labeled as "TV Shows" 225, "Top Movie" 226, "All Movies" 227 and "New This Month" 228.

To obtain the information via a home page data model, the view host 224 (or other suitable code) communicates with a navigator 230 (an object or the like) in a navigation system 232, as represented by arrow labeled one (1). The navigator 230 accesses the set of data model objects 234 (arrow two (2)), and thereby obtains the data model object 236 bound to the home page 222.

The data model object 236 is received (arrow three (3)) and processed by a navigation router 238 (e.g., an object) to determine what the data model object 236 represents, e.g., how navigation is to occur, which is based upon the data in the home page data model object 236. In this example, the navigation router 238 determines from the data and known types of locations that the type of location is a menu, and provides this information to the navigator 230 (arrow (4)), and thereby in turn to a renderer 242 (arrow five (5)). The renderer 242 thus renders a menu page, using the information in the home page data model object 236 to render the UI elements 225-228. In this example, the information known is that there are four "tile" data elements, labeled—"TV Shows" "Top Movie" "All Movies" and "New This Month"—respectively.

Figure 3:
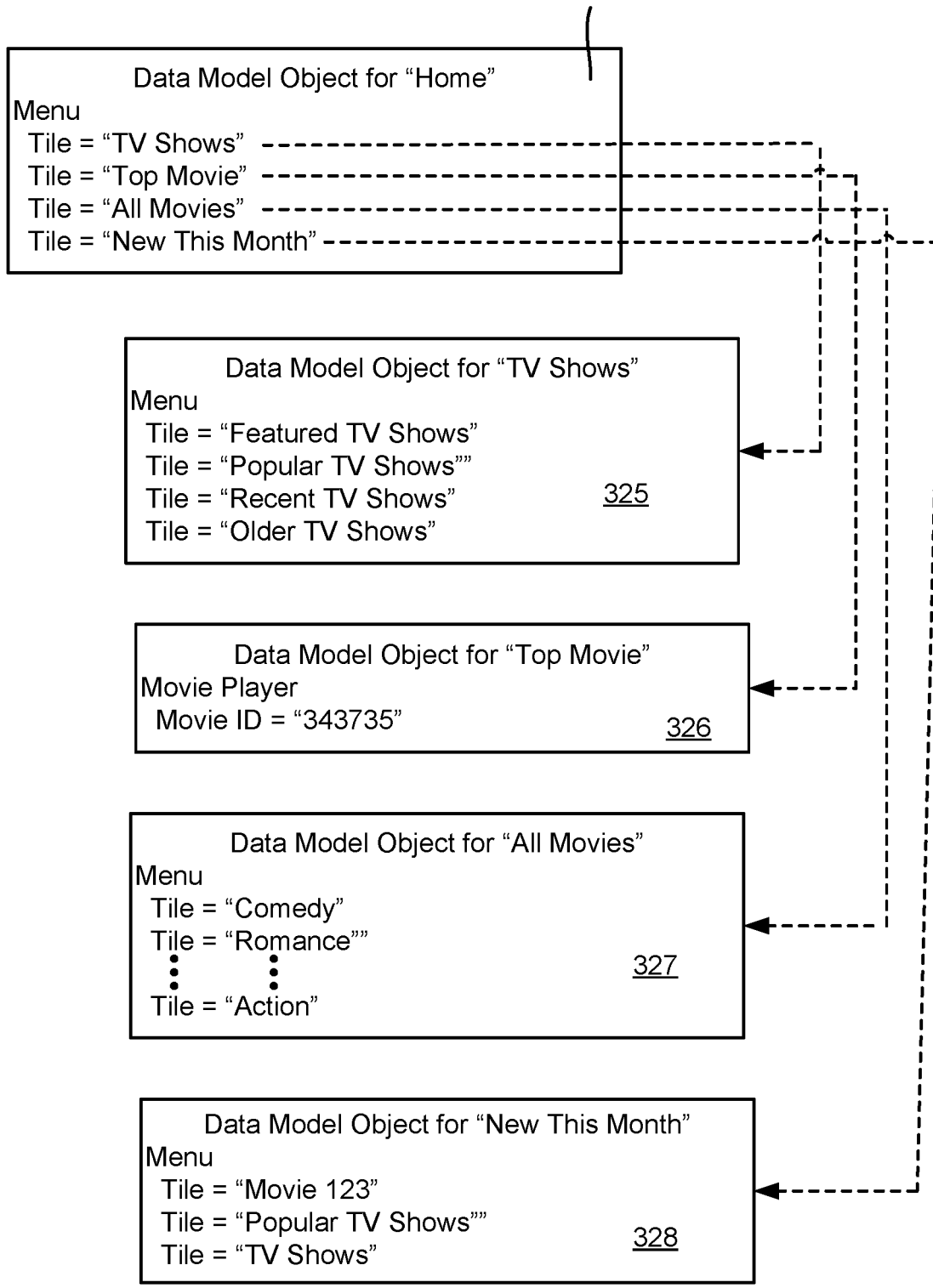
FIG. 3 is representation of an example data model hierarchy corresponding to items on the home page, according to one or more example implementations.

This is exemplified in FIG. 3, where the data in the home page data model object 236 indicates that it is a menu location, and lists, in the order to be rendered, "TV Shows" "Top Movie" "All Movies" and "New This Month" as interactive tile elements. While this simple format thus may be used to accomplish the data driven navigation, it is understood that this is only an example, and that a more elaborate format may be present. For example, for each element, instead of or in addition to basic text, image/icon data (the image data itself or a reference thereto), appearance information, (e.g., red text on a white background in a specified font and size), animation data, video data and so forth may be provided. With additional information, the elements need not be rendered in the order provided, e.g., the data may specify to render them alphabetically or based upon some other ordering scheme. Similarly, note that instead of simply identifying the location as a "menu" location, additional information regarding the menu's appearance may be provided, e.g., fixed menu text and/or images, background color and so on. As long as the renderer knows how to interpret such appearance and/or other data for a menu location, the menu and its elements are rendered as specified in the data.

Further, an element layout pattern may be provided in a data model, e.g., horizontal, vertical, grid or the like. Note that this alternatively may be accomplished by specifying different menu types, e.g., a horizontal menu, a vertical menu, a grid menu, instead of the single "menu" type identified in the example data model object 236 of FIG. 3.

Still further, the renderer 242 may use a factory to provide a view object for rendering (as is generally known in object-oriented programs). This may include styling data for the view, e.g., color, text font and size, animation data, and so on.

As also represented in FIG. 3, each of these UI elements 225-228 is associated with its own data model 325-328, respectively, e.g., each comprising a data model object having a suitable identifier. Note that an identifier may be an actual object ID (that is at least unique in a given namespace), however in the example of FIG. 3 such an object ID is not shown for purpose of clarity; instead the data model's element (tile) text is shown (via the dashed arrows) as being coupled to a respective data model object.

When a UI element is selected, the home page 222 does not know anything about the selected UI element's purpose. Instead, a UI element is selected, the home page 222 in general only needs to identify the associated data model object to the navigation system 232, which determines from that identified data model object a navigation action to take. Indeed, as will be understood, the UI elements for "TV Shows" 225, "All Movies" 227 and "New This Month" 228 will result in (different) menu pages or the like being rendered, whereas the "Top Movie" 226, will invoke a movie player location (page), which for example may begin playing the top movie (identified in its respective data model) automatically, without any additional user interaction. As can be seen, the home page 222 need not be coded with any of this information, and in general once rendered only needs the ability to communicate the data model object ID of which UI element was a UI element is selected to the navigation system upon selected of an element.

The data model object for each UI element contains the action for that UI element, e.g., navigate to a menu (or other page), activate a movie player to automatically (or if desired, interactively) play the "Top Movie" title, or do something else, like present text and images on a static or mostly static page.

Figure 4:
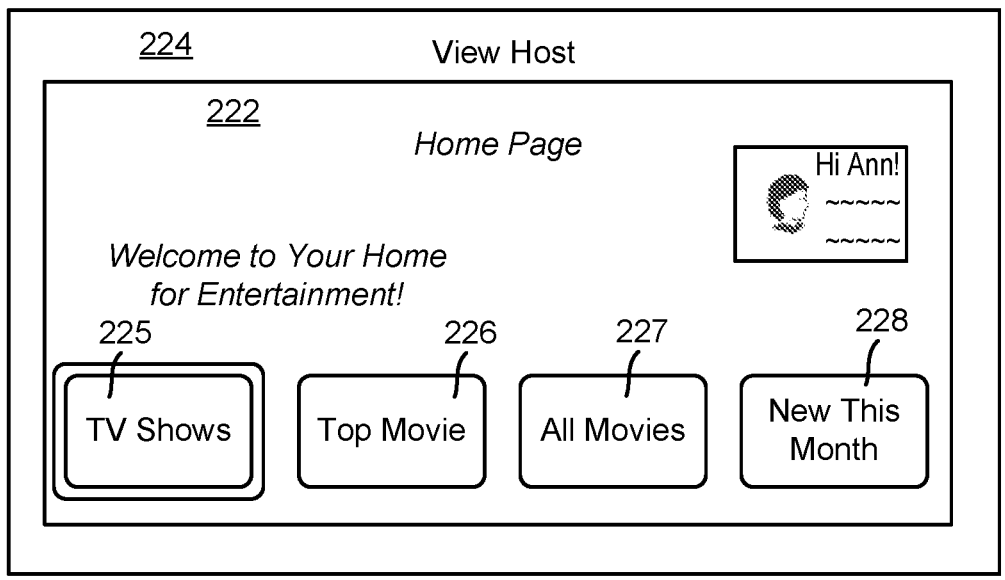
FIG. 4 is a representation of a new location (e.g., a menu page) rendered based upon a data model bound to a home page data element, according to one or more example implementations.
Figure 4:
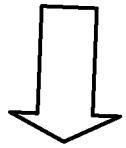
Figure 4:
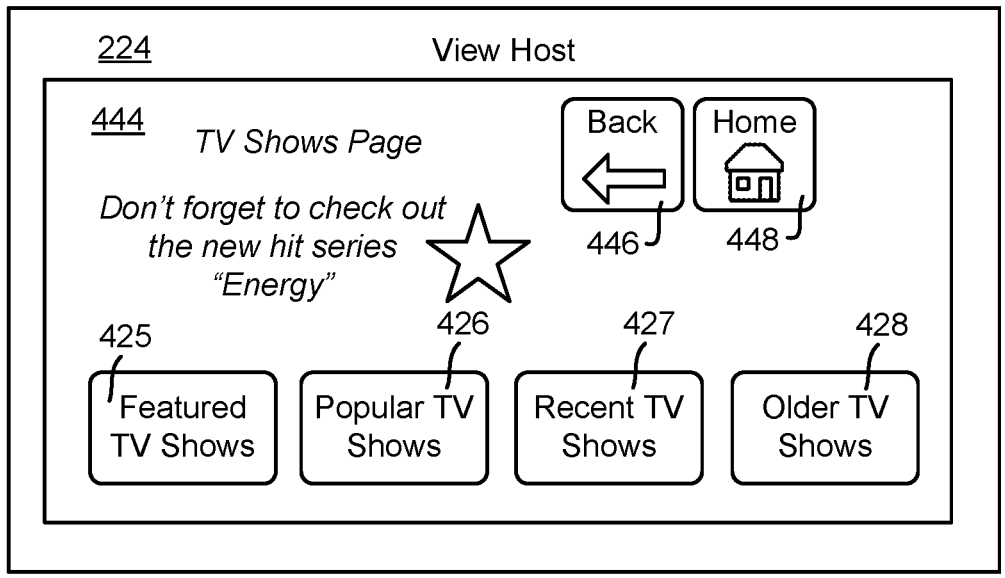

Thus, in the example of FIG. 4, consider that the "TV Shows" element 225 gets selected; as can be seen from FIG. 3, this results in a new data model object 332 being retrieved, namely the one bound to the "TV Shows" UI element. As also understood from FIG. 3, the location type of this data model object is "Menu" and also specifies four interactive UI elements comprising tiles, namely:

Tile="Featured TV Shows"
Tile="Popular TV Shows"
Tile="Recent TV Shows"
Tile="Older TV Shows"

When the "TV Shows" menu page 444 is rendered as represented in the lower portion of FIG. 4, appropriate interactive elements 425-428 for these tiles appear in the menu page 444. It is seen that other information such as text, and a "star" image also is rendered in this example, although the data for these (whether actual data or via a reference thereto) is not shown in the "TV Shows" data model 325 for purposes of clarity and brevity.

Note that a back button 446 and a home button 448 also appear in this example menu page. As described below, whether each such button appears (or perhaps almost always appears but is sometimes inactive and displayed as grayed out or the like) depends on whether there is a meaningful place to navigate back to if selected. In this example the user may go back to the home page, so such buttons 446 and 448 are likely active and appear in an active state. Because the navigation system 232 generally handles the management of these buttons, the data model does not specify them (although it possibly may specify where and how they appear if rendered, such as to go with a page theme).

Returning to FIGS. 2 and 3, consider that the user has instead selected the "Top Movie" tile. As seen in FIG. 3, the associated data model object 326 is not a menu location, but rather a movie player location. The navigation system 232 thus navigates to a movie player page, with the movie identifier that is present in the data object used to access the correct movie.

In one or more implementations, a content (e.g., movie) player page may simply start playing the content, with no additional user interaction needed. In alternate implementations, a content player page may instead allow some user interaction, such as a UI element to allow a user to read content details (e.g., for a movie, cast and crew, reviews and so on) along with a UI element in the form of a play button play the content. Such an interactive page need not be a menu, as interaction may only change what and how visible content is displayed on the page, as specified in the data model object. However, a content player page data model object also may include a UI element that binds to another data model object, and in this way acts as a menu page. There is no limitation on how pages and data models may be used, as long as the navigation system knows how to handle such a location. Indeed, there may be different types of content player pages in the same system (differentiated by data in the corresponding data model object) or the data model object may include information such that as little as a single location can handle multiple types of content player pages, e.g., via data that specifies "play at once" or "play after ten seconds if no interaction" or "play only on a "play" button, and so on, with any additional interaction options specified.

Figure 5:
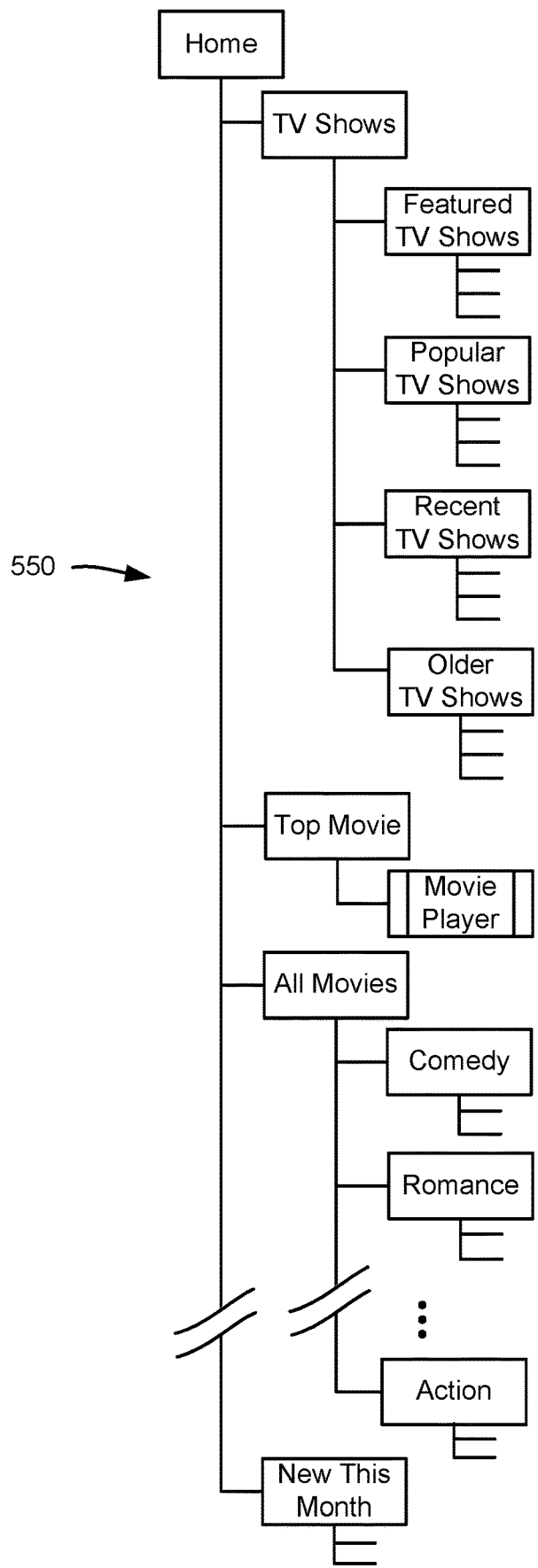
FIG. 5 is representation of an example data model hierarchy which data-driven navigation is configured to traverse, according to one or more example implementations.
Figure 6:
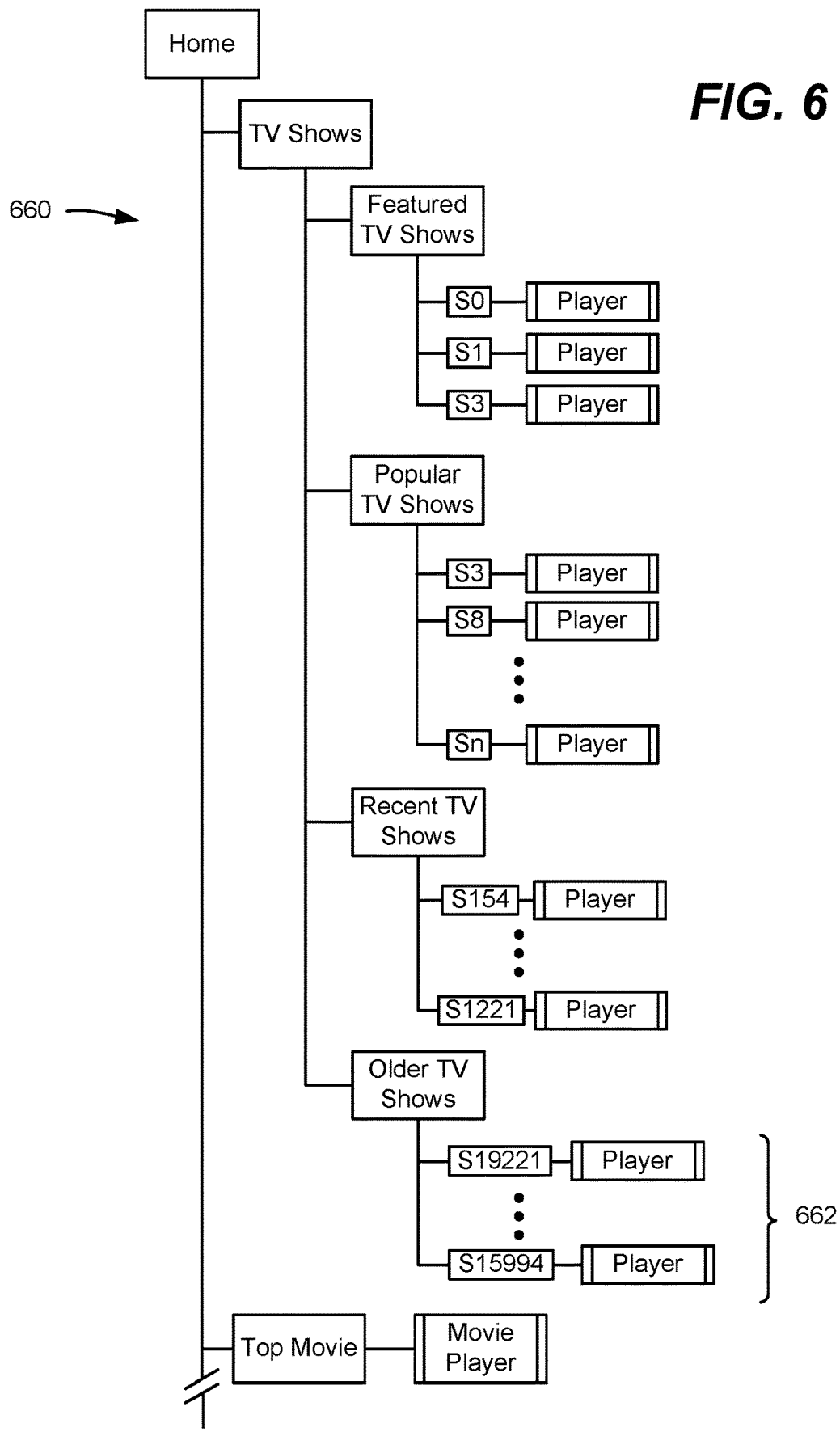
FIG. 6 is an expanded representation of (part of) the example data model hierarchy of FIG. 5, according to one or more example implementations.

Among other advantages of data-driven navigation, consider that the data model hierarchy needs to be changed. FIG. 5 shows part of an example data model hierarchy 550, which generally mirrors the examples of FIGS. 1-4. FIG. 6 shows a data model hierarchy 660 comprising the top portion of FIG. 5 somewhat expanded into more detail.

Figure 7:
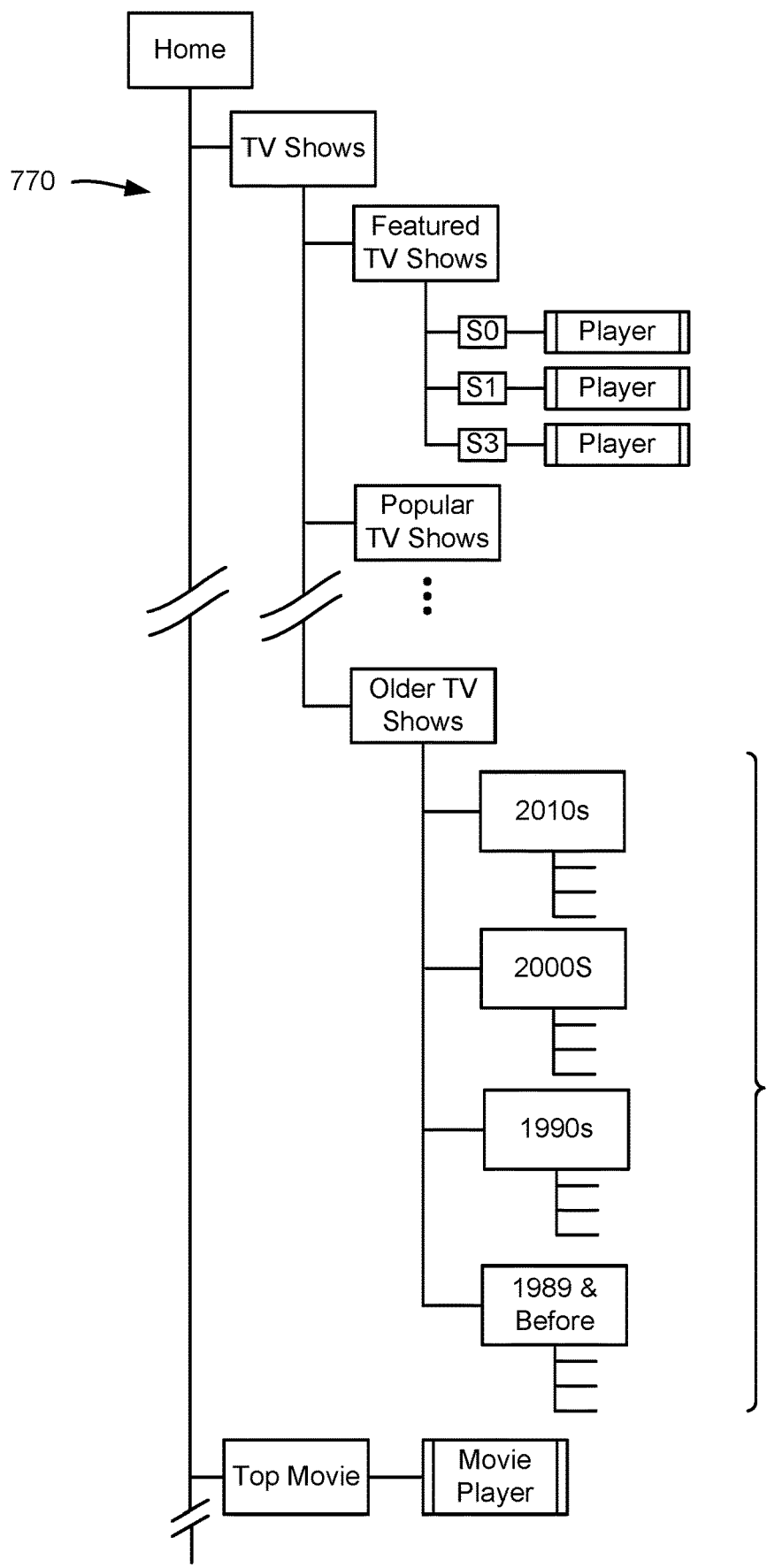
FIG. 7 is representation of a modified example data model hierarchy which data-driven navigation automatically is able to traverse, according to one or more example implementations.

As one example, consider that in the data model hierarchy 660 of FIG. 6 there are too many shows 662 listed under the "Older TV Shows" category, e.g., because users have provided feedback indicating that it takes too long to scroll among the many shows to find a desired one. Thus, the data model hierarchy 660 of FIG. 6 is changed to the data model hierarchy 770 as in FIG. 7, to include new sub-menus 772 under the "Older TV Shows" selection, such that the shows 662 under the "Older TV Shows" category needs are grouped into subcategories, generally divided by decades— "2010s" "2000s" "1990s" and "1989 & Before".

Figure 8:
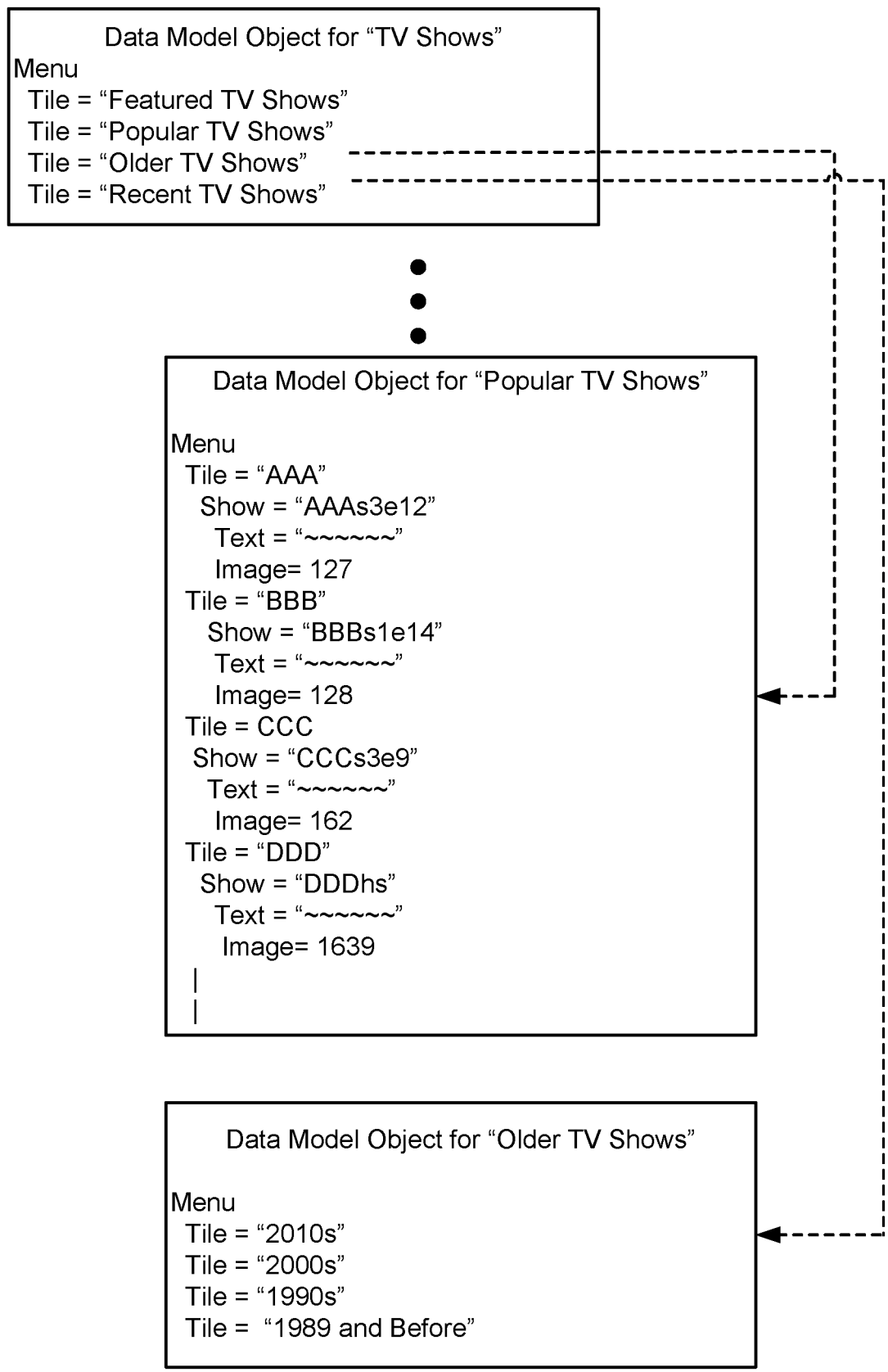
FIG. 8 is representation of an example modified set of data models corresponding to the data model hierarchy of FIG. 7, according to one or more example implementations.
Figure 9:
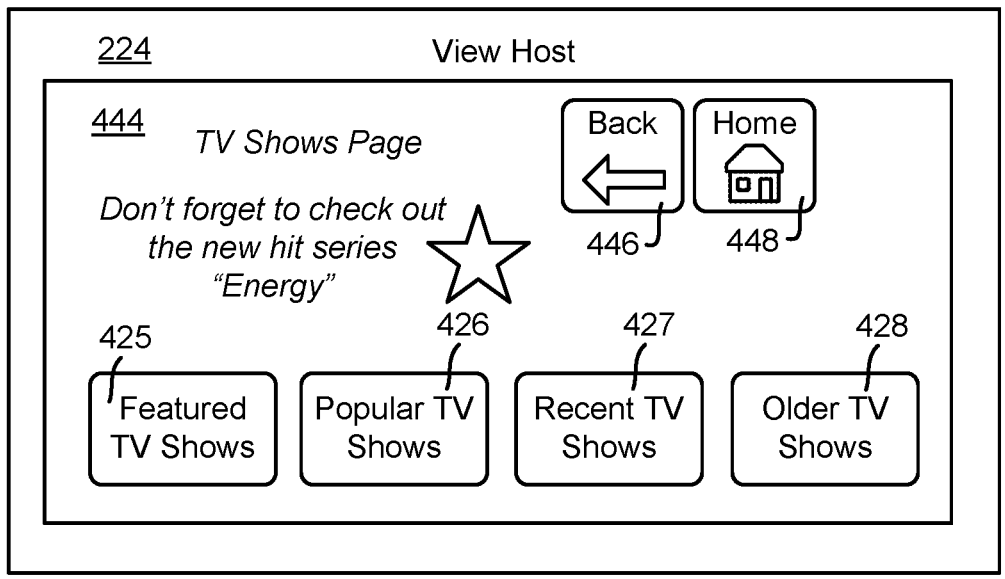
FIG. 9 is a representation of a new location (e.g., a menu page) rendered based upon the modified data models corresponding to FIGS. 7 and 8, according to one or more example implementations.
Figure 9:
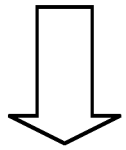
Figure 9:
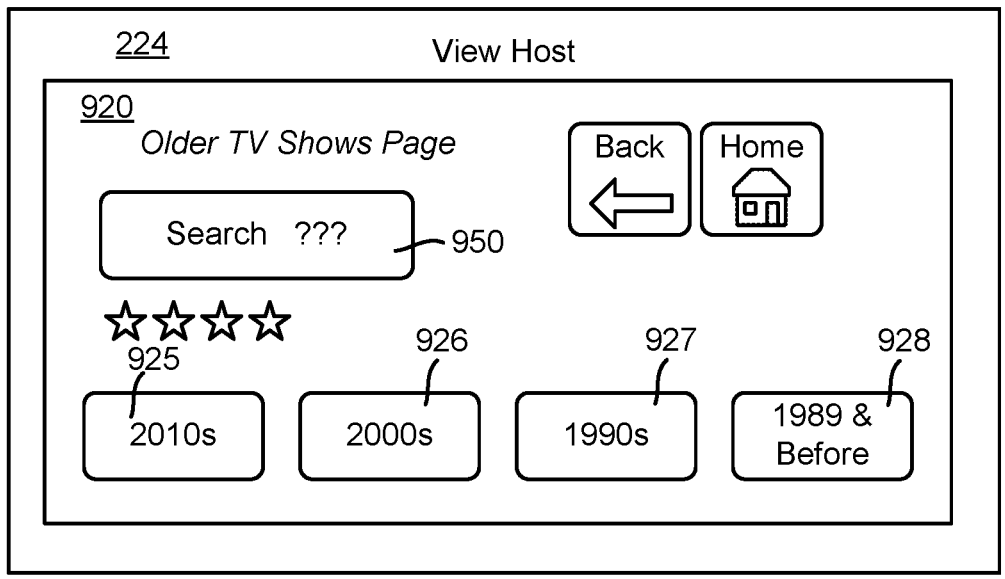

As shown in FIGS. 8 and 9, nothing other than the data models need to change, e.g., the data model object for "Older TV Shows" is changed to a "menu" location comprising UI tile elements (FIG. 9), instead of a "content player" location (possibly a different one for television shows versus movies) that includes a large list of the older shows (not separately shown). In conjunction with the new element creation, four new data model objects are created that each are content player locations, one for "2010s", one for "2000s", one for "1990s" and one for "1989 & Before," with the list of older shows divided under each data model object by their dates. When the "Older TV Shows" element 428 is selected (FIG. 9), a menu page 920 with the desired new UI elements 925-928 is rendered. In a conventional link-driven navigation system, such a change is not possible without also changing the page code and links, because a conventional page only knows to display a single list of shows and link to play a selected show, for example.

Figure 10:
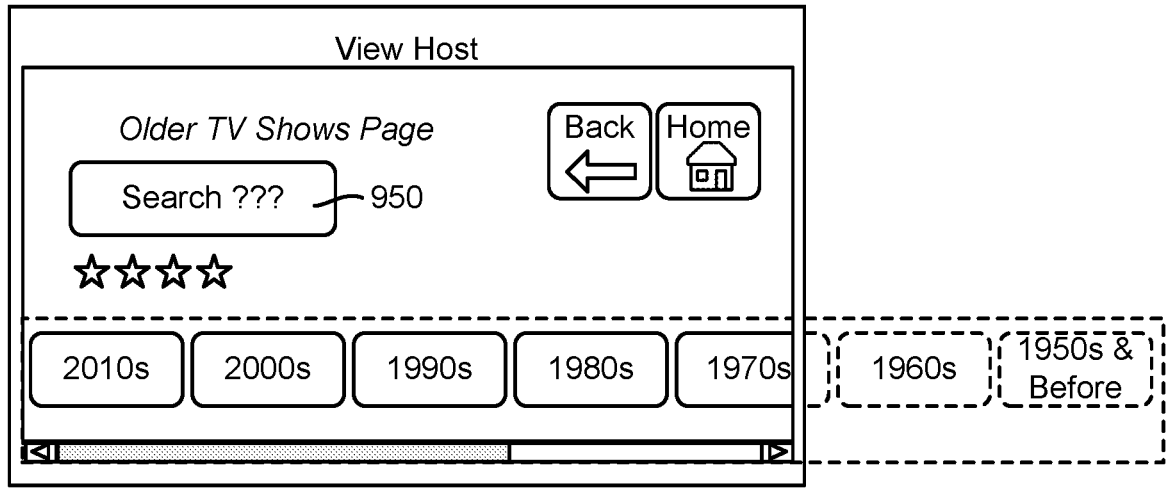
FIG. 10 is a representation of another new location (e.g., a menu page) rendered based upon a further modified data model, according to one or more example implementations.

FIG. 10 shows this example taken further, where it is decided that "1989 & Before" is also not specific enough. However, it is deemed by the decision makers that a new submenu is not needed for this purpose, but rather a more granular division of the data. Thus, the data model object for "1989 & Before" is not changed to a menu location, but rather the data model object "Older TV Shows" is updated with additional tiles to provide an updated data model object 1060, and the data model object for "1989 & Before" is divided up and replaced with data model objects for: "1980s" "1970s" "1960s" and "1950s & Before" in this example, each with a corresponding tile UI element in the "Older TV Shows" data model. Note that the container that presents the new UI elements when rendered is a scrollable container in this example.

FIGS. 9 and 10 also demonstrate a new type of interactive element, comprising a search button 950. In data driven navigation, a straightforward way to do this is to add a "Search ???" UI element as a (modified) menu item, such as with rendering instructions that tell the renderer not to render the search button in line with the other selections so as to stand out to the user. If selected, the search button may be linked to a search page location, which may be in the form of a menu, such as one configured based upon a search data model (e.g., specifying a text input field) to receive alphanumeric characters and to search a namespace of the relevant place in the current navigation hierarchy; e.g., when search is selected, navigate to "search data model" with namespace=all titles under "Older TV Shows" or the like. The search data model identifies that it is a search page; (there may be different types of search data models and search pages, such as one for category searches that differs from alphanumeric searches), hence a data model for each, however if not, a single data model for all searches may be used. In this way, it is straightforward to add data to a menu page that enables a search of any namespace corresponding to that menu page. Again, in this example there is no change to any page code or link on any page involved, only a change to the data model of a menu page to provide access to search functionality from that page.

Significantly, data model objects may be reused across different menus providing the benefits of reuse, (as well as other advantages related to navigation, described below). For example, consider that a movie category of "Popular now" includes a movie tile for some movie "ZZZ" along with other movie tiles that are deemed popular. The same movie tile "ZZZ" may also appear in a "Recent" menu, an alphabetic menu, a comedy genre menu and a romance genre menu. As another example, consider that a button such as "Top Movie" may appear in a "Suggested" menu as well as a "Home" page menu. Simply manipulating data in the appropriate data model objects allows this to function seamlessly.

Figure 11:
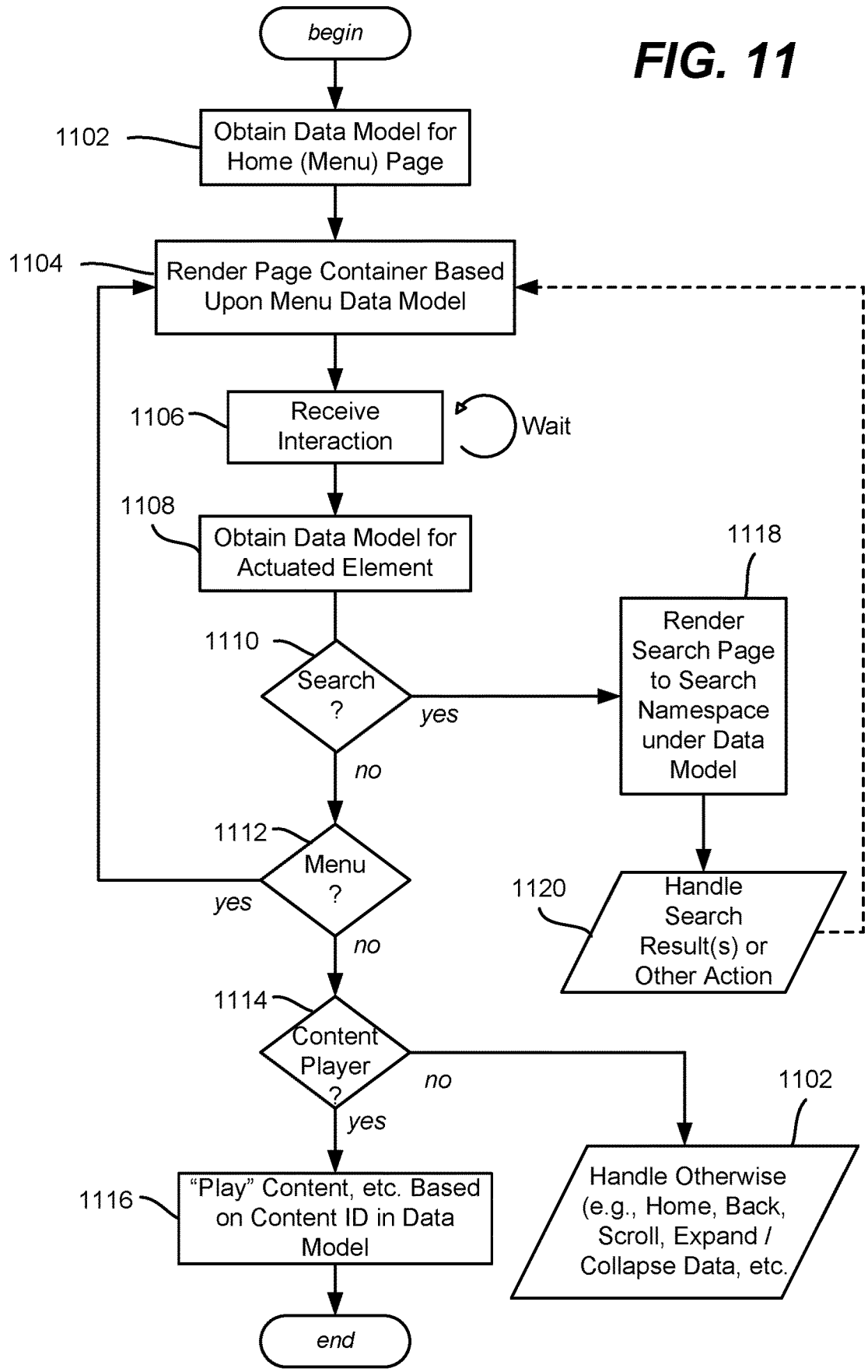
FIG. 11 is a flow diagram showing example steps that may be taken by a navigation system to provided data-driven navigation, according to one or more example implementations.

FIG. 11 summarizes some of the above concepts in a simplified flow diagram containing example steps for handling data-driven navigation, starting at step 1102 where the home page data model is obtained and used to render the home page at step 1104. FIG. 11 is limited to data-driven navigation to menu pages, a content player page, and a search page, although as is understood, any number of other location types may be recognized by the navigation router and appropriately handled. In this example, interaction options may be active or not active (or not present) at times, including search, home, back, and so on.

Step 1106 represents waiting for user interaction with the currently rendered page. Step 1108 represents obtaining the data model for that element. Note that not all interaction is necessarily related to a data model, e.g., a user may interact to expand text that is already present in the currently retrieved data model, a user may interact to scroll and so on, however it is understood that step 1108 is for when a new data model is needed.

It also should be noted that because a higher-level data model (parent) has the identifier information for its lower-level data model or models (children), it is feasible to pre-fetch and cache any lower-level data model (and possibly its children, and so on) in anticipation of the need for the lower-level data model. Thus, instead of waiting for user interaction, some pre-fetching (and possibly pre-rendering) work may be performed that reduces any latency issues and thereby increases the perceived speed of the program. Thus, as used herein, "access" and the like (e.g., "accessed," "accessing" and so on) with respect to a data model may result from retrieval of the data model before any user interaction, as well as in response to user interaction.

Step 1110 evaluates whether the selected element and any retrieved data model is related to search. If not, step 1112 evaluates (e.g., in the navigation router) whether the selected element is related to a new menu location by a new data model object of this type. If so, step 1112 returns to step 1104 to render the new menu page with its corresponding UI element(s), and so on, until the user selects a non-menu UI element or takes some other action.

If not a menu location, step 1114 evaluates whether the new page is a content player location. If so, step 1116 plays the corresponding content identified in the data model object, (although as mentioned above, a more complex content player page may be provided).

If not a search location, menu location or content player location, than the non-data driven navigation interaction (in this simplified example) is handled at step 1122. Examples of non-data driven navigation interaction may include home and back button navigation, expanding or collapsing a data item, scrolling, and so forth.

Search is represented at steps 1118 and 1120. If there is more than one type of search page, then a different data model (step 1108) is used to guide the rendering of the page in accordance with that model. Otherwise, the search page is rendered as specified by a single data model.

Any search results are presented to the user via step 1120. For example, this may be a special list menu of items that match the search, which may wait for an "Enter" command, or alternatively be dynamically updated as the user enters new characters or categories. Other actions taken while searching may be to select an item that is found via the search page, which may include accessing the data model for the item selected. It is also feasible that the search results in another menu, in which step 1120 handles the search results by obtaining a data model for that menu and returning to step 1104 (as represented by the dashed arrow from step 1120 to step 1104).

As can be seen, locations, which represent navigable 'pages' based on data are rendered in View Hosts, which comprise the UI that interactively displays that data to the user. The platform navigation system, described herein and generally represented in FIGS. 1 and 2, may be encapsulated in a navigator object and a NavigationRouter object, and includes a number of features that are significantly different from a conventional navigation system, including data-driven navigation.

With data-driven navigation, the navigator traverses to and from locations; the NavigationRouter works with the navigator, e.g., by passing the data model associated with a user action to the NavigationRouter. The NavigationRouter is configured to map data models to locations, whereby as services or locations are added or removed, and UI on existing pages needs to be updated to account for the change, there is a consolidated way of processing navigation actions.

Turning to another aspect, in a conventional navigation system, a given location typically allows for only two actions, like a stack, namely traversal forwards through a link, which creates a new entry in the navigation history, or traversal backwards to a previous location, which removes the current location from the history. In contrast, the navigator allows for lateral navigation as well, which both adds a new entry to the history and removes the current link from the history.

Figure 12A:
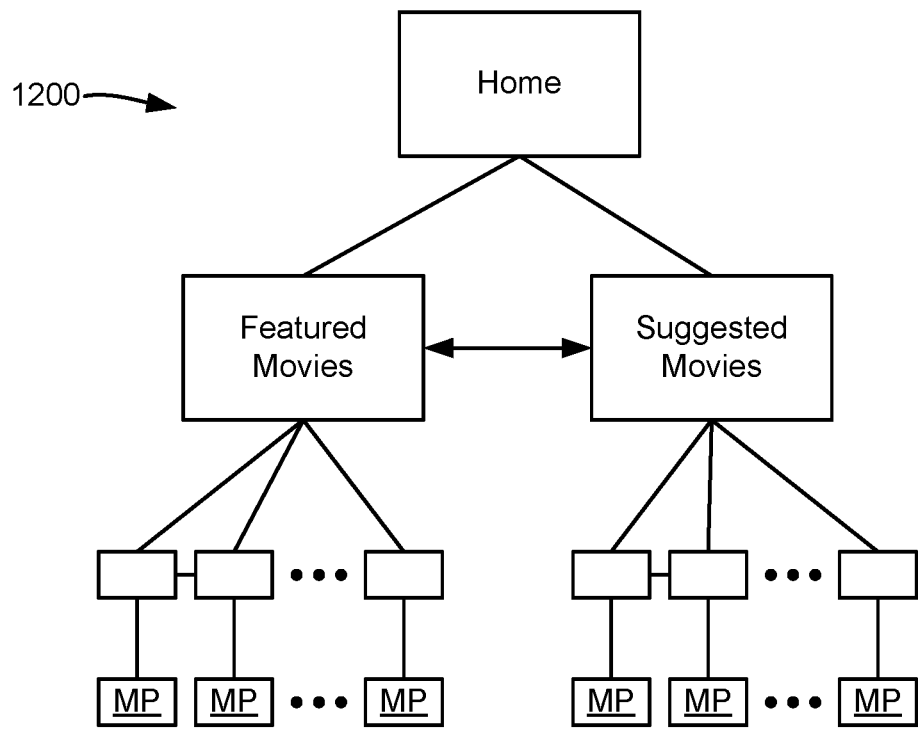
FIGS. 12A and 12B are representations of hierarchical navigation including lateral navigation and a navigation stack, according to one or more example implementations.

By way of example, consider that as represented by the hierarchy 1200 navigated in FIG. 12A, a user may navigate from "Home" to a "Featured Movies" menu or from "Home" to a "Suggested Movies" menu (backwards navigation is also allowed). By placing a UI element for a category at the same hierarchical level, lateral (peer) navigation is also available. In this example, a UI element for "Featured Movies" is present in the "Suggested Movies" menu, whereby lateral navigation from "Featured Movies" to "Suggested Movies" is possible. Note that in this example, a UI element for "Suggested Movies" is similarly present in the "Featured Movies" menu, whereby lateral navigation is available in both directions, as indicated by the arrow. In this example, items below each menu are movies, each bound to a content (movie) player location.

Instead of maintaining a full stack history, the navigation system described herein is able to navigate hierarchically. For example, if a user navigates laterally between the "Suggested Movies" menu and the "Featured Movies" menu any number of times, the "Back" button still moves the user up a hierarchical level, that is, to the "Home" menu. Perhaps more beneficial is that a user clicking through the various items hierarchically underneath the "Featured Movies" or "Suggested Movies" menu, e.g., twenty items, does not have to back out through all twenty items to get back to the "Featured Movies" menu, but rather simply selects the Back button once.

Figure 12B:
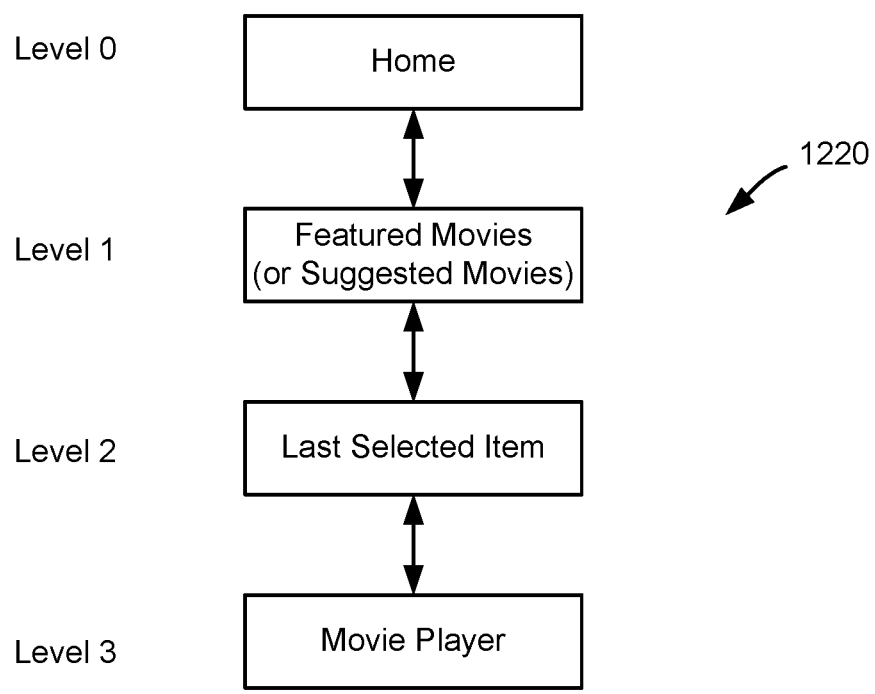

This generally may be performed by having the navigation system maintain only one item per lateral level in a hierarchically-leveled stack. An example stack 1220 is shown in FIG. 12B, where a back button selected at any level moves the user up the stack (until "Home" is reached). Note that in a more complex hierarchy there may be many additional levels, such as for sub-menus of menus and sub-menus of those sub-menus, and so on, however FIG. 12B represents a stack the hierarchy of FIG. 12A. In any event, only one item may be maintained per hierarchical level to provide for a hierarchical-based stack traversal. It is feasible for some limited number of items to be maintained per level, such as two items per level instead of one item, for example.

Thus, in a common stack-style navigation system, navigating through lots of related content can build up a relatively large stack of history; for content that is hierarchical, navigating through each element in a group can make it difficult to return to the location for the group itself, because the user has to back out again through each item visited.

Instead, via a hierarchical stack navigation system, allowing lateral navigation but maintaining only one item in the same level of a hierarchy, as in FIGS. 12A and 12B, solves this problem, because only the current item in that level exists in the history, and traversing back returns the user to the location for the group above instead.

Another common feature of a conventional navigation system is a link to 'Home' or to a similar higher-level location. This typically clears out the existing history and starts the user over, as though the user had just started a session with the application from scratch.

Figure 13A:
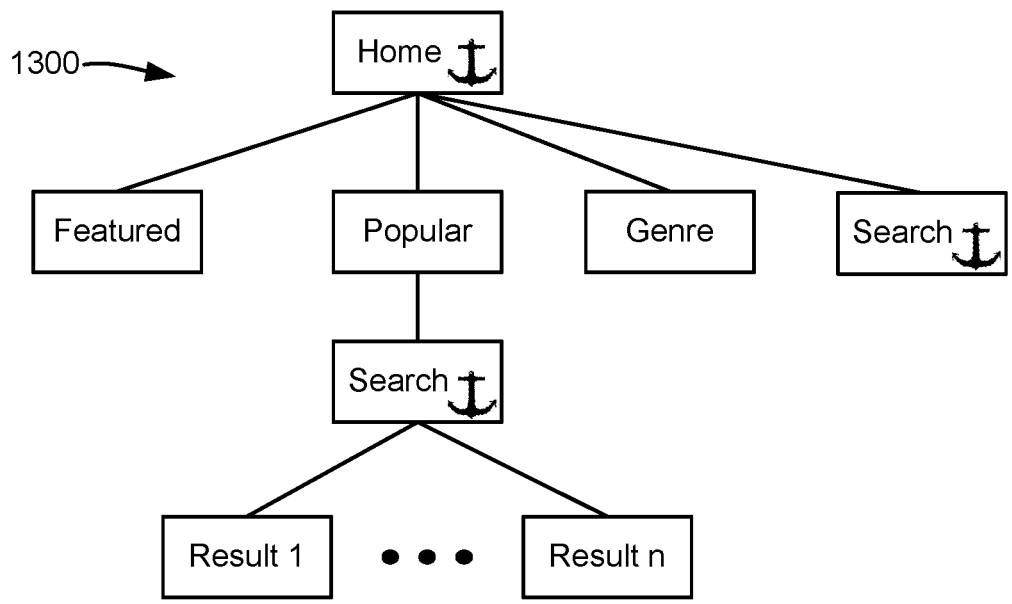
FIG. 13A is a representation of navigation among locations including locations designated as anchors, according to one or more example implementations.

In contrast, the navigator described allows for a more flexible concept, referred to as an 'anchor' herein, as generally represented in FIG. 13A. To this end, history from the top-level to the anchor point may be preserved, but history beyond the anchor point may be discarded. This operation can be configured to occur either when navigating to or from an anchor.

In the example of FIG. 13A, the navigation stack may be "Home" (level 0)→"Popular" (level 1)→Search (level 2)→Result 1 (level 3; in this example, although as is understood, it may be whatever result item was the last search result). Thus, the user can go "back" to the Search (level 2) anchor but not lose the intermediate "Popular" page in the navigation stack.

Discarding the history below after navigation from an anchor is useful because it gives the user a second chance to avoid the history being deleted if the user mistakenly traverses to a new location. For example, if a user has a great deal of history, and accidentally navigates to a higher-level location that is marked as an anchor, the user can traverse to the previous location without losing that history. Only if the user navigates forward again from that top-level location is the history cleared, which confirms an intent to abandon the previous history.

Moreover, anchor locations do not have to be 'top-level' locations in the application. In the example 1300 of FIG. 13A, the application has a 'Home' location and a 'Search' (level 1) location that is accessible from 'Home'. However, 'Search' is also somewhat like a top-level location, because the user may navigate to a number of pages from Search, then link directly back to Search and navigate elsewhere. These redundant Search queries showing up in the history again is likely not what the user wants, so clearing the history is desirable, but the user also likely wants to be able to navigate back from Search to Home. Marking Search as an anchor yields this behavior, because the portion of the history from the root (Home) to the anchor (Search) can be preserved when the user traverses back to the anchor.

Another capability of the navigation system (e.g., the NavigationRouter) is history generation, which refers to the ability to automatically generate history for the user based on the data type. Certain kinds of data, such as a video, can be launched without traversing many pages. History generation may be used to ensure that a user has certain kinds of locations in the user's history (e.g., the detail location for the movie or episode being played). This also enables a user to jump directly into a location anywhere in the application via a deep-link, and for the application to create an appropriate set of history for that user that simulates how they may have navigated there interactively.

Figure 13B:
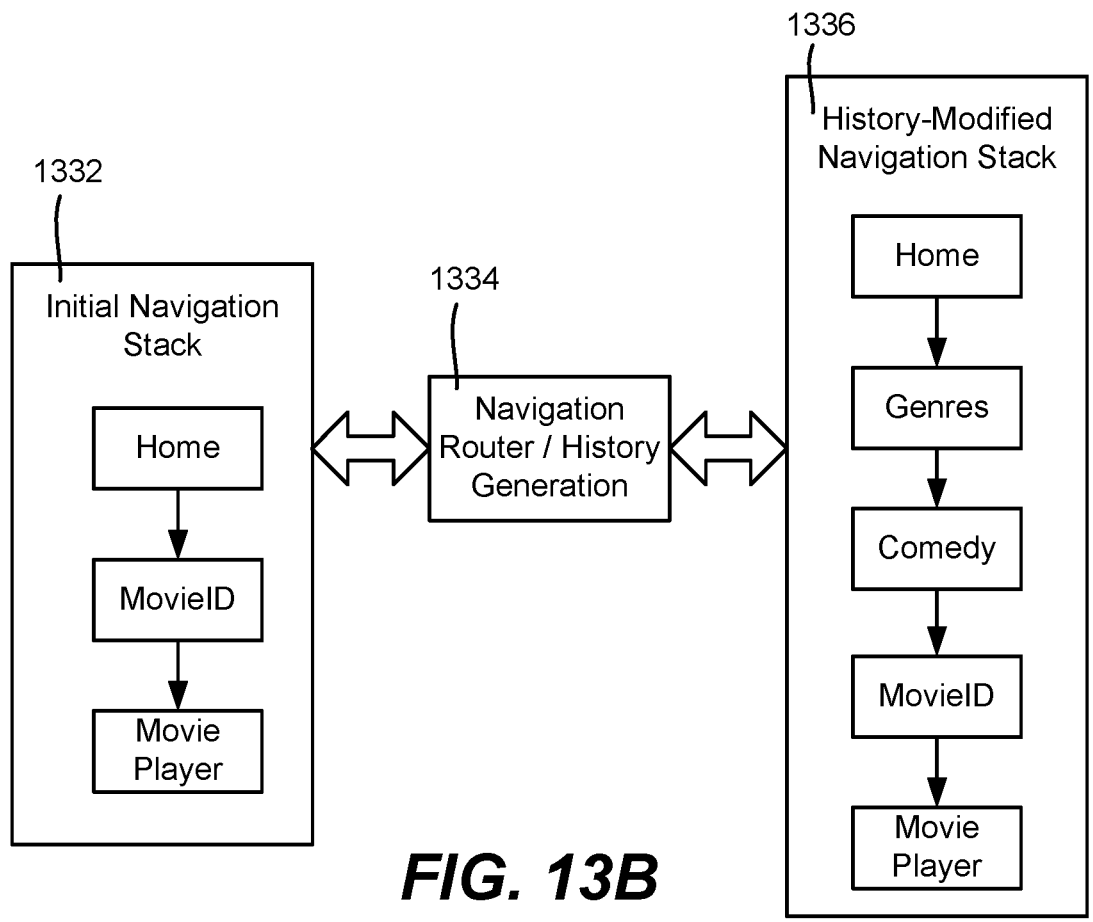
FIG. 13B is a representation of an example of automatically generated simulated navigation history, according to one or more example implementations.

For example, as represented in FIG. 13B, if a user deep-links directly to a video such as from the home page, the initial stack 1330 is simply from "Home"→"Movie-ID"→Movie Player." History may be generated by a navigation router with history generation capabilities (block 1332) to provide a modified stack 1334 containing "Home"→"Genres"→"Comedy"→"MovieID"→Movie Player." Navigation back towards Home is thus via a different navigation path than originally taken by the user.

The historically generated information is obtainable via the data model, e.g., it is determinable from the data model that the genre of the movie associated with this ID is comedy. However, this is only one example; the generated history may instead have been "Popular" between home and the movie. Determination of what history to generate may be random, but alternatively may be based upon concepts such as past user behavior, statistics of other users and so forth.

As can be seen, the technology described herein passes in a data structure to a navigation system, which looks at data in the data structure to navigate. This data-driven navigation has numerous benefits and advantages, including but not limited to changing program actions based upon changes to data and/or a data hierarchy (rather than changing program code), and providing for straightforward peer navigation and hierarchical navigation.

One or more aspects are directed towards rendering a representation of a navigation location, including providing a set of one or more interactive user interface elements that are each bound to a data model. A selected user interface element that is bound to an associated data model is selected, and the associated data model accessing. Data in the associated data model is used to determine a next navigation location.

The associated data model may include data that indicates that the next navigation location is a menu location having another set of one or more interactive user interface elements that are each bound to a data model. Navigation to the menu location is described, including rendering a representation of the menu location that includes the other set of the one or more interactive user interface elements.

A next navigation location may be a content player location, corresponding to rendering a representation of the content player location. The content player location may play content identified in the associated data model.

The next navigation location may be a search location. If so, a representation of the search location is rendered.

The associated data model may be changed so that a subsequent navigation is to a different location. The associated data model may include data that indicates that the next navigation location is a menu location having another set of one or more interactive user interface elements that are each bound to a data model; the associated data model may be changed to have a different set of one or more interactive user interface elements.

The associated data model may be part of a hierarchy of data models, which may be changed by changing the data of at least one data model.

One or more aspects are directed towards data models arranged in a hierarchy, in which the hierarchy is based upon information in each higher-level data model that binds that higher-level data model to a set comprising one or more lower-level data models. A navigation system is configured to use data in a higher-level data model to access a lower-level data model of the higher level model's set. The navigation system includes a navigation router that uses data in the lower lower-level data model to determine a navigation location to which to navigate to provide a user interface that corresponds to the navigation location and is based upon the lower-level data model.

The navigation router may map location type information in the lower-level data model to a location. The navigation location may include one or more user interface objects rendered in a view object.

The higher-level data model may correspond to a higher-level menu navigation location having an interactive user interface element bound to the lower-level data model, and the navigation system may navigate to the navigation location identified in the selected lower-level data model based upon interaction with the interactive user interface element. The interaction may cause navigation among hierarchical levels of navigation locations that correspond to the data model hierarchy, and the navigation system may maintain a navigation stack containing only one location for each hierarchical level.

The navigation system may provide an anchor location above which navigation history is maintained and below which navigation history is discarded. The navigation history may be discarded if user intent indicates that the navigation history is to be discarded.

The navigation system automatically may generate at least part of a navigation history to simulate a navigation stack. For example if deep linking to a data element, a path, including a location for each hierarchical level between the element and the location, may be simulated.

One or more aspects are directed towards presenting a menu to a user, the menu containing at least one interactive navigation element bound to a data model, and detecting selection of an interactive navigation element. A set of data models is accessed to locate a data model associated with the interactive navigation element, and the data model used to determine a navigation location. Navigating to the navigation location is further described.

Navigating to the navigation location may comprise rendering a page containing visible information that is based at least in part upon the data model, and allowing user interaction with the page. A reference to the navigation location may be maintained in a navigation stack, including replacing any reference in the navigation stack that references a location in a same hierarchical level to which the page corresponds. Navigating to the navigation location may comprise invoking a content player that plays audiovisual content associated with the navigation location.

Example Computing Device

The techniques described herein can be applied to any device or set of devices (machines) capable of running programs and processes. It can be understood, therefore, that personal computers, laptops, handheld, portable and other computing devices and computing objects of all kinds including cell phones, tablet/slate computers, gaming/entertainment consoles and the like are contemplated for use in connection with various implementations including those exemplified herein. Accordingly, the general purpose computing mechanism described below in FIG. 14 is but one example of a computing device.

Implementations can partly be implemented via an operating system, for use by a developer of services for a device or object, and/or included within application software that operates to perform one or more functional aspects of the various implementations described herein. Software may be described in the general context of computer executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is considered limiting.

Figure 14:
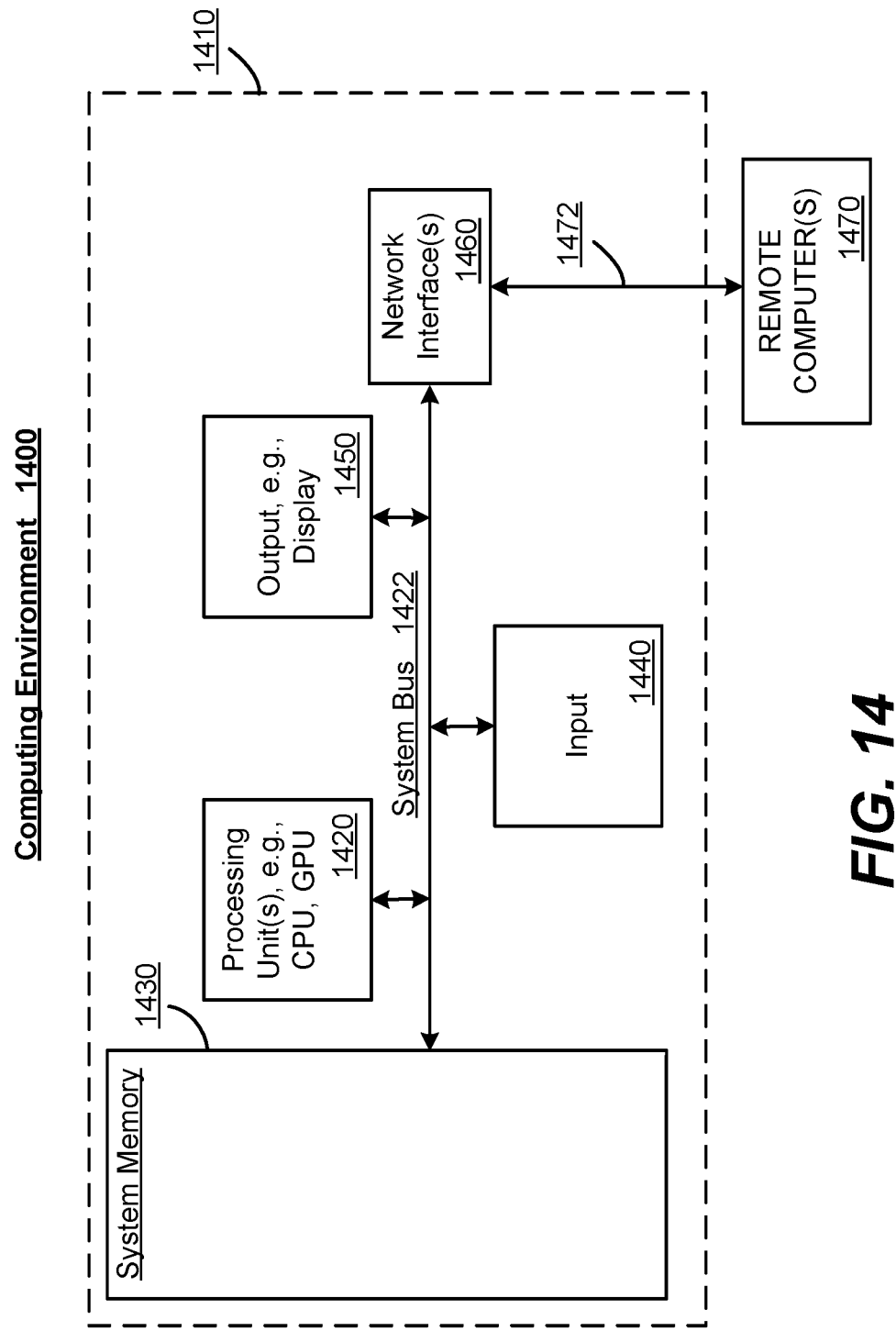
FIG. 14 is a block diagram representing an example computing environment into which aspects of the subject matter described herein may be incorporated.

FIG. 14 thus illustrates an example of a suitable computing system environment 1400 in which one or aspects of the implementations described herein can be implemented, although as made clear above, the computing system environment 1400 is only one example of a suitable computing environment and is not intended to suggest any limitation as to scope of use or functionality. In addition, the computing system environment 1400 is not intended to be interpreted as having any dependency relating to any one or combination of components illustrated in the example computing system environment 1400.

With reference to FIG. 14, an example device for implementing one or more implementations includes a general purpose computing device in the form of a computer 1410. Components of computer 1410 may include, but are not limited to, a processing unit 1420, a system memory 1430, and a system bus 1422 that couples various system components including the system memory to the processing unit 1420.

Computer 1410 typically includes a variety of machine (e.g., computer) readable media and can be any available media that can be accessed by a machine such as the computer 1410. The system memory 1430 may include computer storage media in the form of volatile and/or nonvolatile memory such as read only memory (ROM) and/or random access memory (RAM), and hard drive media, optical storage media, flash media, and so forth; as used herein, machine readable/computer readable storage media stores data that does not include transitory signals, (although other types of machine readable/computer readable media that is not storage media may). By way of example, and not limitation, system memory 1430 may also include an operating system, application programs, other program modules, and program data.

A user can enter commands and information into the computer 1410 through one or more input devices 1440. A monitor or other type of display device is also connected to the system bus 1422 via an interface, such as output interface 1450. In addition to a monitor, computers can also include other peripheral output devices such as speakers and a printer, which may be connected through output interface 1450.

The computer 1410 may operate in a networked or distributed environment using logical connections to one or more other remote computers, such as remote computer 1470. The remote computer 1470 may be a personal computer, a server, a router, a network PC, a peer device or other common network node, or any other remote media consumption or transmission device, and may include any or all of the elements described above relative to the computer 1410. The logical connections depicted in FIG. 14 include a network 1472, such as a local area network (LAN) or a wide area network (WAN), but may also include other networks/buses. Such networking environments are commonplace in homes, offices, enterprise-wide computer networks, intranets and the Internet.

As mentioned above, while example implementations have been described in connection with various computing devices and network architectures, the underlying concepts may be applied to any network system and any computing device or system in which it is desirable to implement such technology.

Also, there are multiple ways to implement the same or similar functionality, e.g., an appropriate API, tool kit, driver code, operating system, control, standalone or downloadable software object, etc., which enables applications and services to take advantage of the techniques provided herein. Thus, implementations herein are contemplated from the standpoint of an API (or other software object), as well as from a software or hardware object that implements one or more implementations as described herein. Thus, various implementations described herein can have aspects that are wholly in hardware, partly in hardware and partly in software, as well as wholly in software.

The word "example" is used herein to mean serving as an example, instance, or illustration. For the avoidance of doubt, the subject matter disclosed herein is not limited by such examples. In addition, any aspect or design described herein as "example" is not necessarily to be construed as preferred or advantageous over other aspects or designs, nor is it meant to preclude equivalent example structures and techniques known to those of ordinary skill in the art. Furthermore, to the extent that the terms "includes," "has," "contains," and other similar words are used, for the avoidance of doubt, such terms are intended to be inclusive in a manner similar to the term "comprising" as an open transition word without precluding any additional or other elements when employed in a claim.

As mentioned, the various techniques described herein may be implemented in connection with hardware or software or, where appropriate, with a combination of both. As used herein, the terms "component," "module," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a computer and the computer can be a component. One or more components may reside within a process and/or thread of execution and a component may be localized on one computer and/or distributed between two or more computers.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it can be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In view of the example systems described herein, methodologies that may be implemented in accordance with the described subject matter can also be appreciated with reference to the flowcharts/flow diagrams of the various figures. While for purposes of simplicity of explanation, the methodologies are shown and described as a series of blocks, it is to be understood and appreciated that the various implementations are not limited by the order of the blocks, as some blocks may occur in different orders and/or concurrently with other blocks from what is depicted and described herein. Where non-sequential, or branched, flow is illustrated via flowcharts/flow diagrams, it can be appreciated that various other branches, flow paths, and orders of the blocks, may be implemented which achieve the same or a similar result. Moreover, some illustrated blocks are optional in implementing the methodologies described herein.

CONCLUSION

While the invention is susceptible to various modifications and alternative constructions, certain illustrated implementations thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the invention is not to be limited to any single implementation, but rather is to be construed in breadth, spirit and scope in accordance with the appended claims.

What is claimed is:

1. A system, comprising:
a processor; and
a memory that stores executable instructions that, when executed by the processor, facilitate performance of operations, the operations comprising:
rendering a representation of a first menu page in a view host based on processing a first data model to determine a menu action identified in the first data model, and rendering representations of a first interactive element and a second interactive element in the first menu page based on respective identifiers in the first data model of the first interactive element and the second interactive element;
detecting selection of the first interactive element;
in response to the first interactive element corresponding to a search action, rendering a representation of a search page in the view host;
in response to the first interactive element corresponding to a content player action, rendering a player page in the view host, obtaining a content program associated with the first interactive element in the first data model, and playing the content program in the player page;
in response to the first interactive element corresponding to a menu action, obtaining a second data model based on a reference to the second data model associated with the first interactive element in the first data model, rendering a second menu page in the view host, determining a third interactive element identified in the second data model, and rendering, in the second menu page, a third representation corresponding to the third interactive element; and
maintaining a navigation history associated with navigation locations traversed during user navigation between different levels of the hierarchy and within peer levels of the hierarchy,
wherein the operations further comprise marking a data in the navigation history as an anchor point, and wherein the maintaining a navigation history further comprises, in a case of navigation to another anchor point having a higher level of hierarchy than the anchor point, temporarily maintaining in the navigation history a temporary subset of the navigation locations navigated to below the anchor point, and in response to next navigation from the another anchor point in conjunction with detection of interaction with a back button, allowing access to the temporary subset, or alternatively, in response to next navigation from the another anchor point forward to another navigation location, discarding the temporary subset.

2. The system of claim 1, wherein the first interactive element corresponds to a menu action, wherein the third interactive element corresponds to a content player action, and wherein the operations further comprise detecting an interaction with the third interactive element, and in response to detecting the interaction with the third interactive element, rendering a player page in the view host, obtaining a content program associated with the third interactive element in the second data model, and playing the content program in the player page.

3. The system of claim 1, wherein the first interactive element corresponds to a menu action, wherein the third interactive element corresponds to a menu action, and wherein the operations further comprise detecting an interaction with the third interactive element, and in response to detecting the interaction with the third interactive element, obtaining a third data model based on a reference to the third data model associated with the third interactive element in the second data model, rendering a third menu page in the view host, determining a fourth interactive element identified in the third data model, and rendering, in the third menu page, a fourth representation corresponding to the fourth interactive element.

4. The system of claim 1, wherein the operations further comprise detecting an interaction with a back button, and in response to detecting the interaction with the back button, accessing the navigation stack to obtain the second data, and based on the second data, obtaining the second data model, re-rendering the second menu page in the view host, determining the third interactive element identified in the second data model, and re-rendering, in the second menu page, the third representation corresponding to the third interactive element.

5. The system of claim 1, wherein the operations further comprise generating in the navigation history between the first data and the second data based on an alternative navigation path from the first menu page to the second menu page.

6. The system of claim 1, wherein the operations further comprise generating in the navigation history between the second data and the third data based on an alternative navigation path from the second menu page to the third menu page.

7. The system of claim 1, wherein the first interactive element corresponds to a menu action, wherein the third interactive element corresponds to a search action, and wherein the operations further comprise detecting interaction with the third interactive element, and in response to detecting the interaction with the third interactive element, rendering a representation of a search page in the view host, and providing search results based on interaction with the search page.

8. The system of claim 7, wherein the operations further comprise maintaining, in the navigation history, first data corresponding to the first menu page, second data corresponding to the second menu page, and third data corresponding to the search page.

9. The system of claim 8, wherein the providing the search results based on interaction with the search page comprises outputting first search results and outputting second search results, and wherein the operations further comprise, prior to the navigation to the another anchor point, detecting interaction with a back button presented in conjunction with the second search results, and in response to the detecting the interaction with the back button, navigating back to the search page, instead of navigating back to the first search results, based on the third data in the navigation stack being marked as the anchor point.

10. The system of claim 9, wherein the navigating back to the search page, instead of navigating back to the first representation of first search results, based on the third data in the navigation stack being marked as the anchor point comprises discarding the first search results.

11. The system of claim 1, wherein the first interactive element corresponds to a menu action, wherein the third interactive element corresponds to a menu action, and wherein the operations further comprise detecting interaction with the third interactive element, and in response to detecting the interaction with the third interactive element, obtaining a third data model based on a reference to the third data model associated with the third interactive element in the second data model, rendering a third menu page in the view host, determining a fourth interactive element identified in the third data model, rendering, in the third menu page, a fourth representation corresponding to the fourth interactive element, re-rendering the representation of the first menu page, including re-rendering, in the first menu page, the first representation corresponding to the first interactive element and the second representation corresponding to the second interactive element, detecting selection of the second interactive element, and in response to detecting the interaction with the second interactive element, obtaining a fourth data model based on a reference to the fourth data model associated with the second interactive element in the second data model, rendering a fourth menu page in the view host, determining a fifth interactive element identified in the fourth data model, and rendering, in the fourth menu page, a fifth representation corresponding to the fifth interactive element.

12. The system of claim 11, wherein the operations further comprise maintaining, on a navigation stack that is not represented in the view host, first data corresponding to the first menu page, second data corresponding to the second menu page, third data corresponding to the third menu page, fourth data corresponding to the fourth menu page, and maintaining information that indicates that the first data is a hierarchical peer with the second data to facilitate lateral navigation between the first menu page and the second menu page.

13. The system of claim 1, wherein the maintaining a navigation history further comprises maintaining in the navigation history a first subset of the navigation locations associated with a first subgroup of datatypes of a group of datatypes, and excluding from the navigation history a second subset of the navigation locations associated with a second subgroup of datatypes of a group of datatypes.

14. A method, comprising,
   maintaining, by a system comprising a processor, a group of data models arranged in a hierarchy of hierarchical levels, in which information in a data model at a higher

19 level binds the data model to a set comprising one or more lower-level data models;
outputting a representation of a menu data model of the group on a display device, comprising rendering a menu page and rendering interactive representations of data items corresponding to one or more lower-level data models associated with the menu data model in the menu page and one or more peer-level data models associated with the menu data model in the menu page;
navigating, based on user interaction with a first data item of the data items, to a different level of the hierarchy, wherein the first data item corresponds to a first data model associated with the menu data model;
navigating, based on user interaction with a second data item of the data items, to a peer level of the hierarchy, wherein the second data item corresponds to a second data model associated with the menu data model;
tracking, by the device in a navigation history that is not presented on the display, of navigation locations traversed during user navigation between different levels of the hierarchy and within peer levels of the hierarchy, wherein the tracking comprises maintaining in the navigation history a first subset of the navigation locations associated with a first subgroup of datatypes of a group of datatypes, and excluding from the navigation history a second subset of the navigation locations associated with a second subgroup of datatypes of a group of datatypes; and
navigating within a peer level based on detecting interaction indicative of lateral navigation within the peer level and the navigation history,
wherein the second subset is temporarily non-excluded from the navigation history when user navigation traverses from a navigation location associated with the second subset to a navigation location having a higher level of hierarchy than the navigation location associated with the second subset, and wherein the second subset is excluded from the navigation history when user navigation traverses forward from the navigation location having the higher level of hierarchy and not directly next back to the navigation location associated with the second subset or another navigation location associated with the second subset.

15. The method of claim 14, further comprising generating a location in the navigation history that has not been navigated to, based on an alternative navigation path from a location corresponding to the menu data model and a location corresponding to a different level of the hierarchy.

16. The method of claim 14, further comprising marking a location in the navigation history as an anchor point.

17. A non-transitory computer-readable medium having computer-executable instructions stored thereon, which when executed by a processor perform operations, the operations, comprising:
presenting, during user navigation of a navigation system on a display device, at least one representation of at least one navigation location of the navigation system, including providing at least one set of one or more interactive navigation elements that are each bound to respective data models, wherein the data models are arranged in a hierarchy, in which the hierarchy is based upon information in each higher-level data model of the data models that binds that higher-level data model to a set comprising one or more lower-level data models of the data models, and the navigation system allows

20 user navigation between levels of the hierarchy and between a plurality of the data models within a level of the hierarchy;
tracking, in a navigation history, a plurality of navigation locations traversed during the user navigation between the levels of the hierarchy and within the levels of the hierarchy;
detecting, during the user navigation, selection of a first selected interactive navigation element of the one or more interactive user interface elements that is bound to a first data model of the data models, accessing the first data model, using data in the first data model to determine a first navigation location of the at least one navigation location, and rendering a first representation of the first navigation location of the at least one representation, wherein the first data model is on lower level of the hierarchy than a third data model on a higher level of the hierarchy, and the first selected interactive user interface element is selected from a third navigation location;
detecting, during the user navigation, selection of a second selected interactive user interface element of the one or more interactive user interface elements that is bound to a second data model of the data models, accessing the second data model, using data in the second data model to determine a second navigation location of the at least one navigation location, and rendering a second representation of the second navigation location of the at least one representation, wherein the second selected interactive user interface element is selected from the first navigation location, wherein the second selected interactive user interface element is displayed within the rendered first representation of the first navigation location, and the first selected interactive user interface element is displayed within a rendered third representation of the third navigation location; and
in response to determining that the first navigation location has an anchor location designation, determining that further user navigation is forward from the third navigation location, wherein the third navigation location has a greater level of hierarchy than a level of hierarchy of the first navigation location, deleting all navigation locations of the plurality of navigation locations from the navigation history that are prior to the first navigation location, and maintaining the first navigation location and the second navigation location in the navigation history.

18. The non-transitory computer-readable medium of claim 17, wherein rendering the second the navigation location comprises invoking a content player that plays audiovisual content associated with the second navigation location.

19. The non-transitory computer-readable medium of claim 17, wherein the operations further comprise detecting, during the user navigation, selection of a fourth selected interactive user interface element of the one or more interactive user interface elements that is bound to a fourth data model of the data models, accessing the fourth data model, using data in the fourth data model to determine a fourth navigation location of the at least one navigation location, and rendering the fourth navigation location, wherein the second data model is on a first level of the hierarchy and the fourth data model is on a second level of the hierarchy, where the second level is lower in the hierarchy than the first level, and there is at least one intervening level of the hierarchy between the first level and the second level, and the fourth selected interactive user interface element is selected from the second navigation location, and wherein the tracking comprises populating the navigation history, between the second navigation location and the fourth navigation location, with respective intervening navigations locations selected from intervening data models from the at least one intervening level representing a previously traversed navigation path between the second data model and the fourth data model.

20. The non-transitory computer-readable medium of claim 19, wherein the populating the navigation history is based upon at least one of past user behavior or statistics of other users.

* * * * *